US011650694B2

(12) United States Patent
Kakinoki et al.

(10) Patent No.: US 11,650,694 B2
(45) Date of Patent: May 16, 2023

(54) SENSOR DEVICE INCLUDES A CAPACITIVE TOUCH PANEL CONFIGURED TO DETECT AN INPUT DEVICE HAVING A RESONANCE CIRCUIT THAT INCLUDES TWO CONDUCTORS, INPUT DEVICE, AND METHOD

(71) Applicant: Japan Display Inc., Tokyo (JP)

(72) Inventors: Yuto Kakinoki, Tokyo (JP); Naoki Takada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/477,015

(22) Filed: Sep. 16, 2021

(65) Prior Publication Data

US 2022/0004303 A1    Jan. 6, 2022

Related U.S. Application Data

(63) Continuation of application No. PCT/JP2019/045838, filed on Nov. 22, 2019.

(30) Foreign Application Priority Data

Mar. 20, 2019    (JP) .............................. JP2019-052171

(51) Int. Cl.
*G06F 3/041*    (2006.01)
*G06F 3/044*    (2006.01)
(Continued)

(52) U.S. Cl.
CPC ............ *G06F 3/04166* (2019.05); *G06F 3/02* (2013.01); *G06F 3/0362* (2013.01); *G06F 3/0446* (2019.05)

(58) Field of Classification Search
None
See application file for complete search history.

(56) References Cited

U.S. PATENT DOCUMENTS

2005/0156876  A1*  7/2005  Kong .................. G06F 3/03543
                                                        345/156
2011/0175835  A1*  7/2011  Wang ..................... G06F 3/0446
                                                        345/173
(Continued)

FOREIGN PATENT DOCUMENTS

CN    104216538 A  * 12/2014
CN    109683656 A  *  4/2019  ............... G05G 1/10
(Continued)

OTHER PUBLICATIONS

International Search Report issued in International Patent Application PCT/JP2019/045838 dated Feb. 25, 2020. 5 pages.
(Continued)

*Primary Examiner* — Kirk W Hermann
(74) *Attorney, Agent, or Firm* — K&L Gates LLP

(57) ABSTRACT

A sensor device includes a capacitive touch panel including a plurality of electrodes, an input device configured such that a resonance circuit including a first conductor and a second conductor is covered with a non-conductor, and a sensor controller. The first conductor and the second conductor are capacitively coupled to at least one of a plurality of electrodes in the touch panel when the input device is disposed on the touch panel or when the input device disposed on the touch panel is operated. The sensor controller is configured to detect positions of the first conductor and the second conductor on the touch panel by applying a voltage to the plurality of electrodes in the touch panel based on a resonance frequency of the resonance circuit.

11 Claims, 28 Drawing Sheets

(51) Int. Cl.
*G06F 3/02* (2006.01)
*G06F 3/0362* (2013.01)

(56) References Cited

U.S. PATENT DOCUMENTS

| | | | | |
|---|---|---|---|---|
| 2014/0104224 A1* | 4/2014 | Ih | ............... | G06F 3/0446 |
| | | | | 345/174 |
| 2015/0123940 A1* | 5/2015 | Park | ............... | G06F 3/0445 |
| | | | | 345/174 |
| 2015/0339021 A1* | 11/2015 | Duteil | ............... | G06F 3/0487 |
| | | | | 345/156 |
| 2015/0378492 A1* | 12/2015 | Rosenberg | ............... | G06F 3/04144 |
| | | | | 345/174 |
| 2016/0147317 A1* | 5/2016 | Vandermeijden | ............... | G06F 3/03545 |
| | | | | 345/179 |
| 2016/0147320 A1* | 5/2016 | Krumpelman | ............... | G06F 3/04166 |
| | | | | 345/179 |
| 2017/0336897 A1* | 11/2017 | Zachut | ............... | G06F 3/046 |
| 2018/0300009 A1* | 10/2018 | Kurasawa | ............... | G06F 3/04166 |
| 2018/0373351 A1 | 12/2018 | Sawada et al. | | |
| 2020/0142529 A1* | 5/2020 | Nugraha | ............... | G06F 3/044 |
| 2020/0233521 A1 | 7/2020 | Sasaki et al. | | |
| 2020/0272325 A1* | 8/2020 | Furumoto | ............... | G06F 3/0393 |

FOREIGN PATENT DOCUMENTS

| | | | | |
|---|---|---|---|---|
| JP | 2016-014525 A | 4/2016 | | |
| JP | 6403291 B1 | 10/2018 | | |
| JP | 6532631 B1 * | 6/2019 | ......... | G06F 3/03547 |
| WO | WO2017/094234 A1 | 6/2017 | | |

OTHER PUBLICATIONS

Written Opinion issued in International Patent Application PCT/P2019/045838 dated Feb. 25, 2020. 3 pages.

* cited by examiner

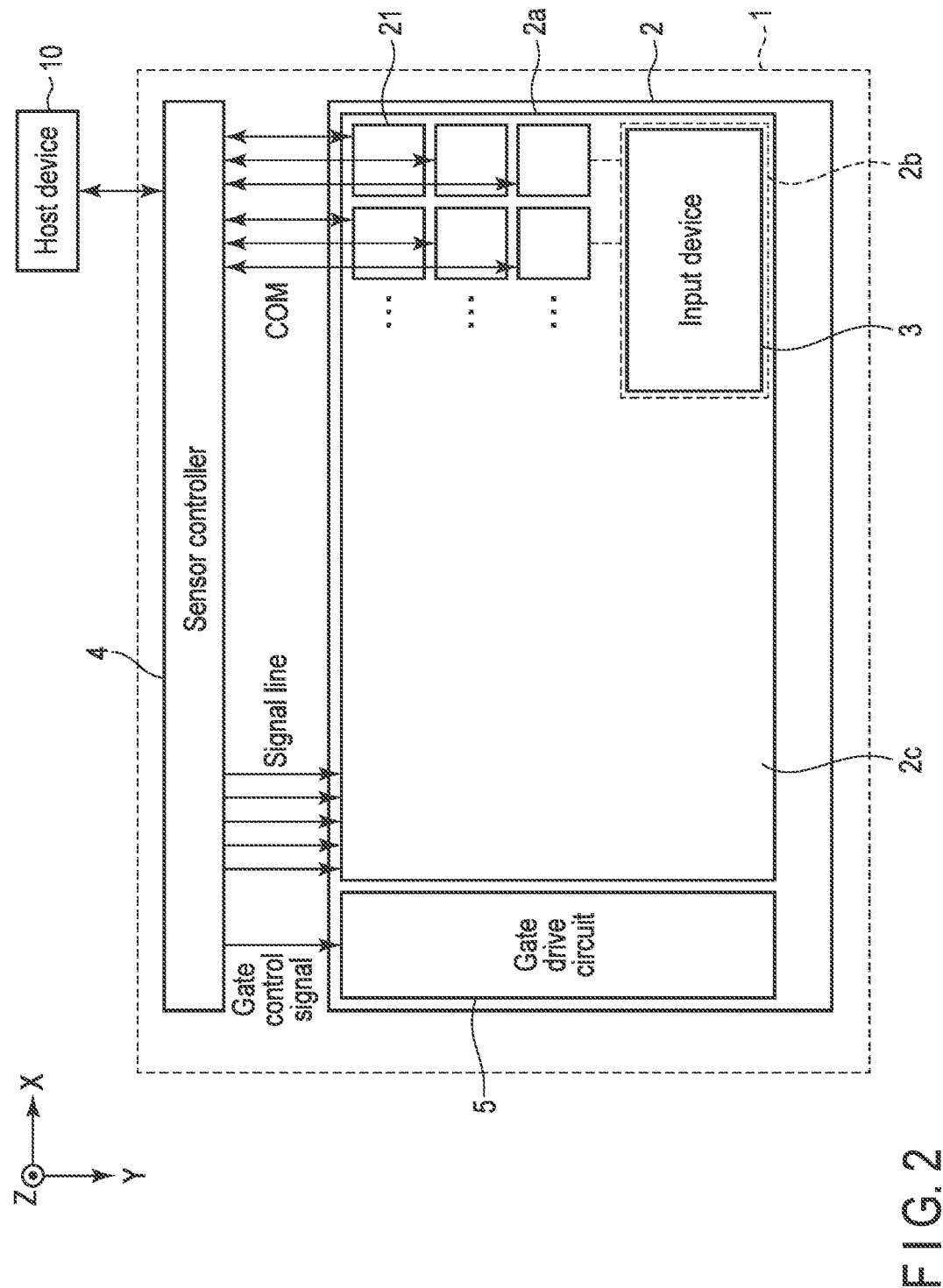
F I G. 2

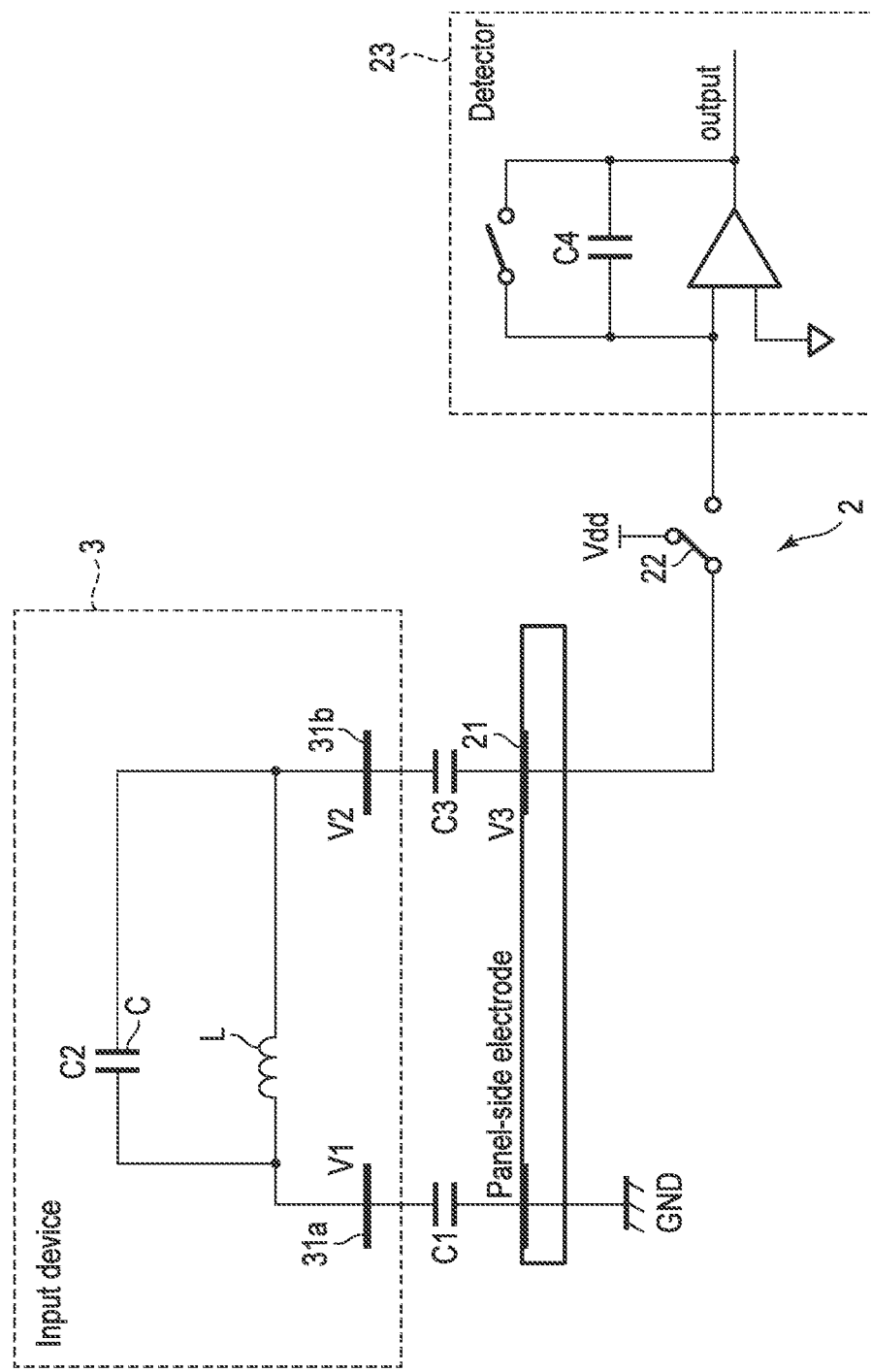
F I G. 6

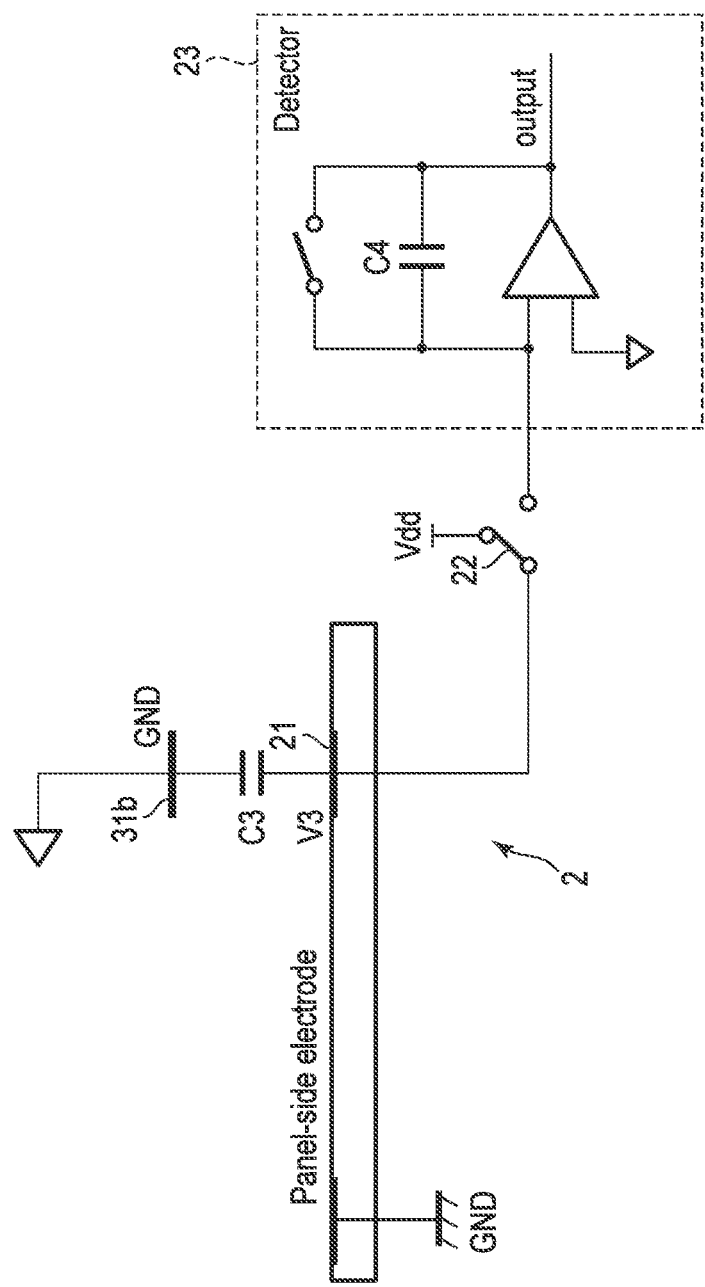
F I G. 9

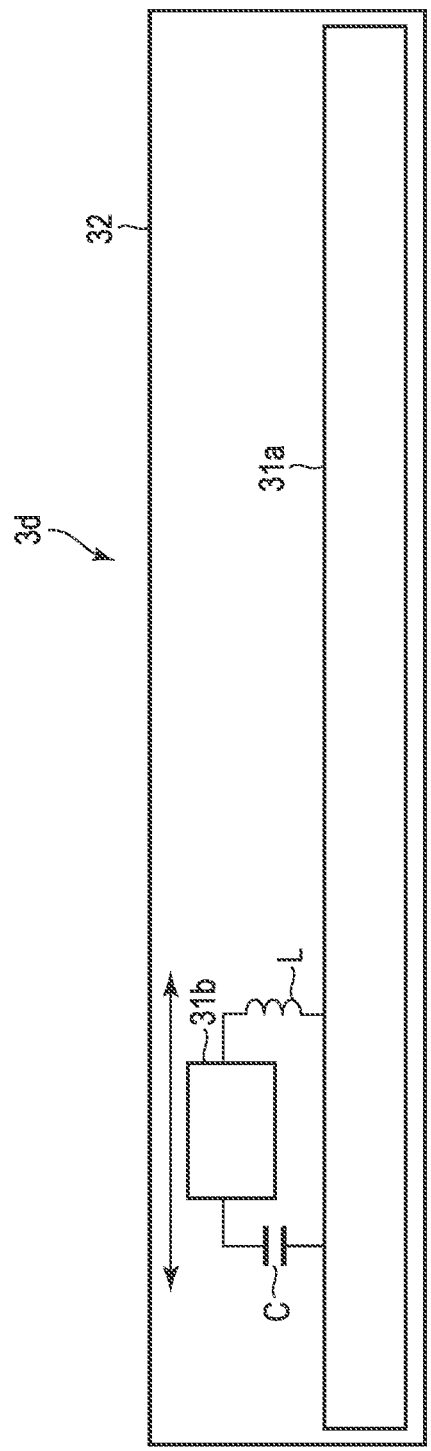
F I G. 23

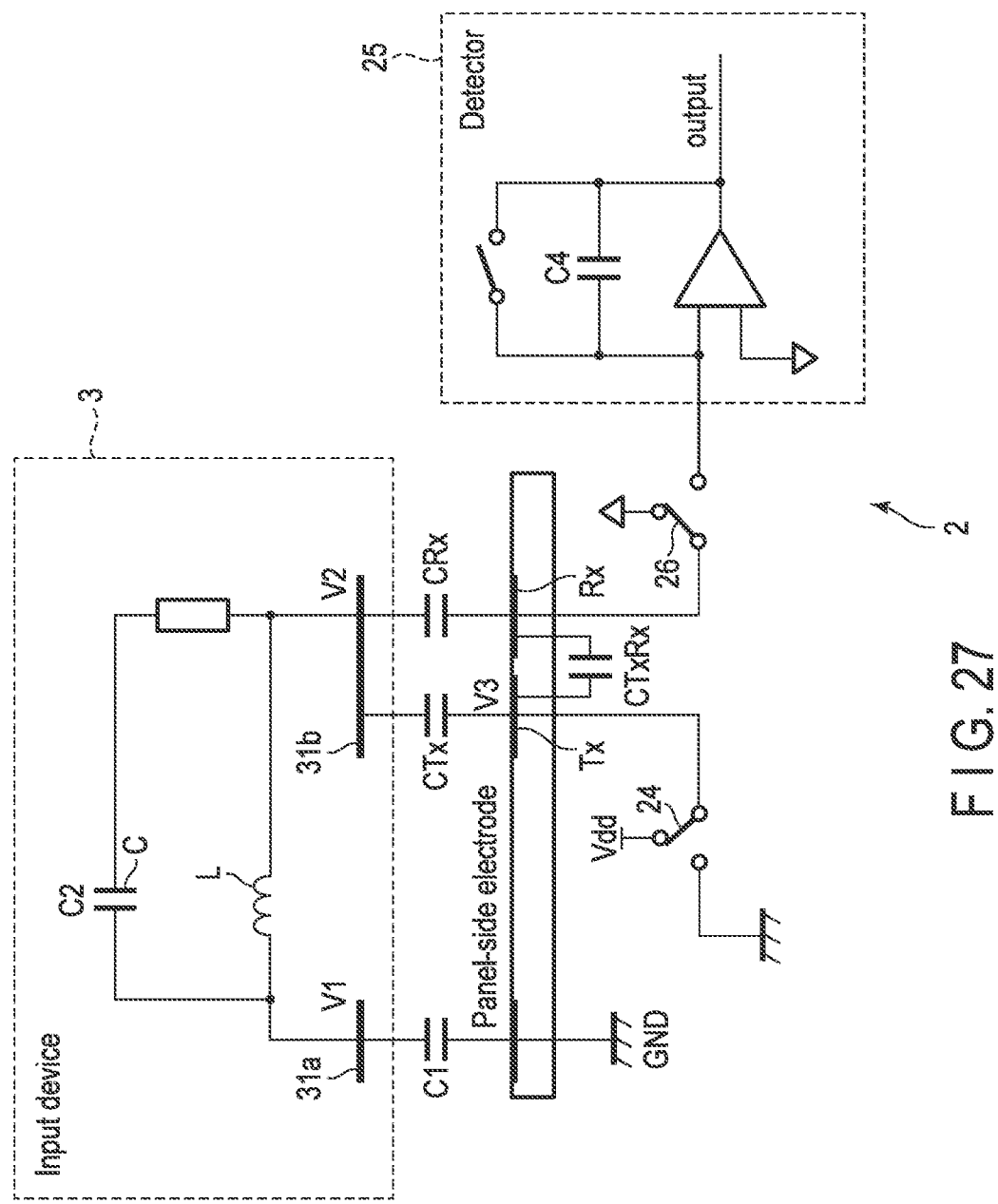
F I G. 27

SENSOR DEVICE INCLUDES A CAPACITIVE TOUCH PANEL CONFIGURED TO DETECT AN INPUT DEVICE HAVING A RESONANCE CIRCUIT THAT INCLUDES TWO CONDUCTORS, INPUT DEVICE, AND METHOD

CROSS-REFERENCE TO RELATED APPLICATIONS

This application is a Continuation Application of PCT Application No. PCT/JP2019/045838, filed Nov. 22, 2019 and based upon and claiming the benefit of priority from Japanese Patent Application No. 2019-052171, filed Mar. 20, 2019, the entire contents of all of which are incorporated herein by reference.

FIELD

Embodiments described herein relate generally to a sensor device, an input device and a method.

BACKGROUND

In general, as an interface of a display device, a sensor (e.g., a touch panel) that detects contact or proximity of an object such as a finger is put into practical use.

Nowadays, it is disclosed that an input device is disposed (attached) on a touch panel and used.

In this case, although a user can operate the input device disposed on the touch panel, it is necessary to detect the user operation on the input device with high accuracy.

SUMMARY

The present application relates generally to a sensor device, an input device and a method.

According to one embodiment, a sensor device includes a capacitive touch panel including a plurality of electrodes, an input device configured such that a resonance circuit including a first conductor and a second conductor is covered with a non-conductor, and a sensor controller. The first conductor and the second conductor are capacitively coupled to at least one of a plurality of electrodes in the touch panel when the input device is disposed on the touch panel or when the input device disposed on the touch panel is operated. The sensor controller is configured to detect positions of the first conductor and the second conductor on the touch panel by applying a voltage to the plurality of electrodes in the touch panel based on a resonance frequency of the resonance circuit.

BRIEF DESCRIPTION OF THE DRAWINGS

FIG. 2 is a diagram illustrating an example of the configuration of the sensor device.

FIG. 6 is a diagram describing the basic principle of a touch detection operation using the resonance circuit.

FIG. 9 is a diagram describing the case in which a user finger is present at a position facing drive electrodes.

FIG. 23 is a diagram illustrating an example of the planar structure of another example of the input device.

FIG. 27 is a diagram describing the basic principle of the touch detection operation using a resonance circuit.

DETAILED DESCRIPTION

Figure 1:
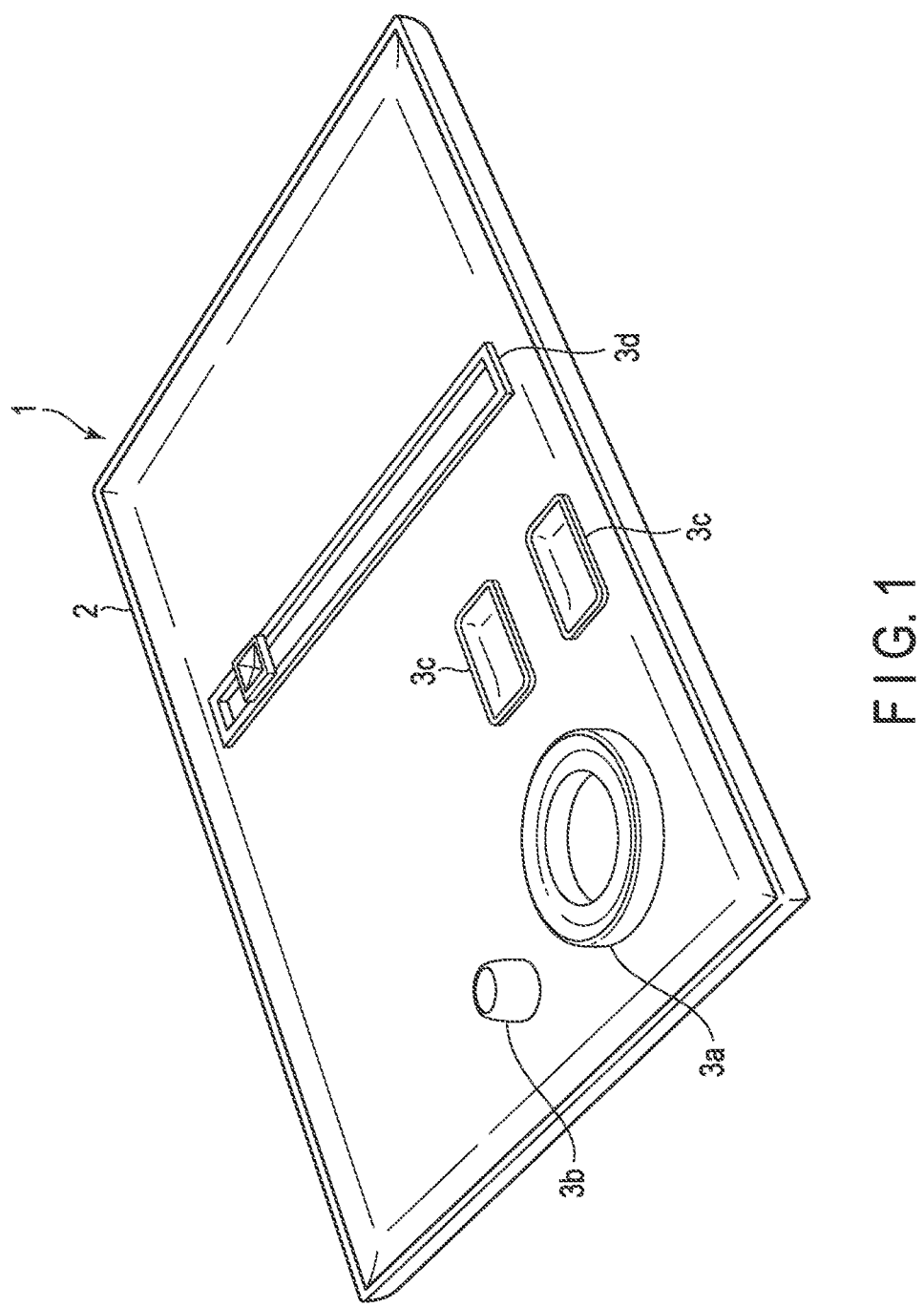
FIG. 1 is a perspective view illustrating an example of the external appearance of a sensor device according to a first embodiment.

In general, according to one embodiment, a sensor device includes a capacitive touch panel including a plurality of electrodes, an input device configured such that a resonance circuit including a first conductor and a second conductor is covered with a non-conductor, and a sensor controller configured to control the touch panel. The first conductor and the second conductor are capacitively coupled to at least one of a plurality of electrodes in the touch panel when the input device is disposed on the touch panel or when the input device disposed on the touch panel is operated. The sensor controller is configured to detect positions of the first conductor and the second conductor on the touch panel by applying a voltage to the plurality of electrodes in the touch panel based on a resonance frequency of the resonance circuit.

Various embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

FIG. 1 is a perspective view illustrating an example of the external appearance of a sensor device according to a first embodiment. A sensor device 1 according to the present embodiment includes a capacitive touch panel 2 as a sensor capable of detecting (in the following, referred to as touch detection) contact or proximity of an object such as a finger.

An example of the capacitive touch panel 2 includes a touch panel that performs self-capacitive touch detection and mutual-capacitive touch detection. In the present embodiment, a touch panel 2 (in the following, referred to as a self-capacitive touch panel 2) that performs self-capacitive touch detection will be described.

Although not illustrated in FIG. 1, the touch panel 2 is mounted on, for example, a display device (display panel). In this case, the touch panel 2 may be formed on the display surface of the display device, or may be integrated with the display device. Although the display device is, for example, a liquid crystal display device using a liquid crystal layer, the display device may be an organic electro luminescence (EL) display device using an organic light emitting layer, an LED display device using a light emitting diode (LED), or the like.

The sensor device 1 according to the present embodiment further includes an input device used being disposed (attached) on the touch panel 2. The input device of the present embodiment includes, for example, input devices 3a to 3d.

The input device 3a is, for example, an input device formed as a knob rotatable about a rotation axis. A user disposes the input device 3a (knob) on the touch panel 2, and thus can perform the operation of rotating the input device 3a.

The input device 3b is an input device formed as a knob that is rotatable about a rotation axis. The user disposes the input device 3b (knob) on the touch panel 2, and thus can perform the operation of rotating the input device 3b.

The input device 3c is an input device formed as a button capable of switching between a pressed state (first state) and an unpressed state (second state). The user disposes the input device 3c (button) on the touch panel 2, and thus can perform the operation of pressing the input device 3c.

The input device 3d is an input device formed as a slider including a member (first member) formed to extend in at least one direction and a member (second member) formed to be slidable along the member. The user disposes the input device 3d (slider) on the touch panel 2, and thus can perform the operation of sliding the second member of the input device 3d to the first member.

In the example illustrated in FIG. 1, although the input devices 3a to 3d are disposed on the touch panel 2, at least one of the input devices 3a to 3d may be disposed on the touch panel 2. Although the input devices 3a to 3d are described here, the input device of the present embodiment may be any device as long as the device is disposed (attached) on the touch panel 2 and used, and may be, for example, a joystick, a jog dial (wheel), or the like.

FIG. 2 illustrates an example of the configuration of the sensor device 1 according to the present embodiment. As illustrated in FIG. 2, the sensor device 1 includes a touch panel 2, an input device 3, and a sensor controller 4.

The touch panel 2 is a self-capacitive touch panel as described above, and includes a plurality of transparent electrodes (in the following, referred to as drive electrodes) 21. The plurality of drive electrodes 21 is disposed in a matrix configuration in a touch detection region 2a in which contact or proximity of an object to the touch panel 2 is detected. Specifically, the plurality of drive electrodes 21 is disposed, for example, in a first direction X and is also disposed in a second direction orthogonal to the first direction X. The touch detection region 2a is a region that matches the display region of a display device on which the touch panel 2 is mounted, for example. The plurality of drive electrodes 21 is connected to the sensor controller 4 through wires.

The input device 3 is disposed on the touch panel 2. The input device 3 may be at least one of the input devices 3a to 3d illustrated in FIG. 1. In the following description, the input device 3 disposed on the touch panel 2 will be mainly described as the input device 3a (knob) described above.

Although the input device 3 is disposed on the touch panel 2, a region (i.e., a region overlapping with the input device 3) 2b of the touch detection region 2a in which the input device 3 is disposed is referred to as an input device region (first region) for convenience. On the other hand, a region 2c other than the input device region 2b in the touch detection region 2a is conveniently referred to as an extra input device region (second region).

The sensor controller 4 detects a user operation on the input device 3 by applying a predetermined voltage (drive signal COM) to the plurality of drive electrodes 21. The sensor controller 4 can also detect, for example, contact or proximity (i.e., the operation of the user with the finger) of a user finger to the extra input device region 2c. In the present embodiment, although it is described that the operation is performed with the user finger other than using the input device 3, an operation using another object such as a pen instead of the user finger may be performed.

The detection result by the sensor controller 4 is output to, for example, the external host device 10 or the like. In the host device 10, processes according to the detection result (user operation) are executed.

In the display region of the display device on which the touch panel 2 is mounted, a plurality of pixels (not illustrated) is disposed in a matrix configuration. The plurality of pixels individually includes a pixel switch (thin film transistor (TFT)), a pixel electrode, and the like. The sensor controller 4 is connected to a gate drive circuit 5 and the like, and supplies gate control signals to (the gate electrode of) pixel switches included in the plurality of pixels through the gate drive circuit 5. As a result, the sensor controller 4 writes, for example, image signals output from the host device 10 to the plurality of pixels through the signal line, and displays an image in the display region of the display device.

That is, in the present embodiment, the sensor controller 4 functions as a display and a touch detection IC (drive unit) that perform the operation of displaying an image on a display device (display region) and the operation of detecting a position of an object on the touch panel 2 (i.e., the operation of the user is detected). In the following description, the operation of displaying an image on the display device (first operation) is conveniently referred to as a display write operation. In the following description, the operation of detecting the position of the object on the touch panel 2 (second operation) is conveniently referred to as a touch detection operation.

The plurality of drive electrodes 21 described above may also be individually used as an electrode (common electrode) for image display.

Figure 3:
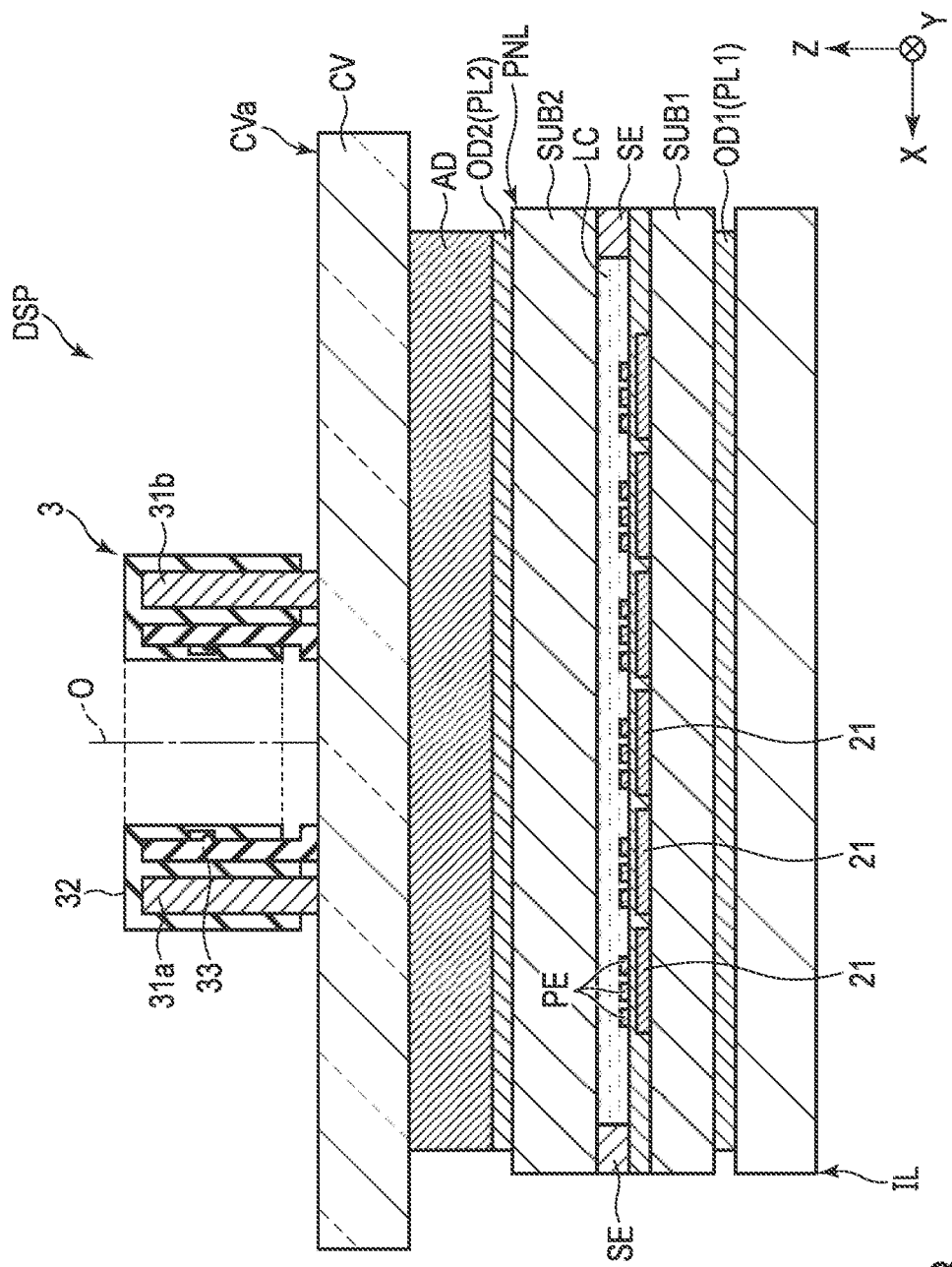
FIG. 3 is a diagram illustrating an example of the cross-sectional structure of a display device on which the sensor device is mounted.

FIG. 3 illustrates an example of the cross-sectional structure of a display device DSP on which the sensor device 1 is mounted. The display device DSP includes a display panel PNL and a lighting device IL. In one example, the display panel PNL is, for example, a liquid crystal display panel, and includes a first substrate SUB1, a second substrate SUB2, and a liquid crystal layer LC.

The first substrate SUB1 is bonded to the second substrate SUB2 with a seal SE. The liquid crystal layer LC is held between the first substrate SUB1 and the second substrate SUB2.

The display panel PNL incorporates the touch panel 2 of the sensor device 1. That is, the first substrate SUB1 includes drive electrode (common electrode) 21 of the touch panel 2 and pixel electrodes PE. One drive electrode 21 faces, for example, the plurality of pixel electrodes PE.

Between the first substrate SUB1 and the lighting device IL, an optical element OD1 including a polarizing plate PL1 is positioned, and is bonded to the first substrate SUB1. Between the second substrate SUB2 and a cover member CV (cover glass), an optical element OD2 including a polarizing plate PL2 is positioned, and is bonded to the second substrate SUB2. The cover member CV is bonded to the optical element OD2 with a transparent adhesive AD.

Although not illustrated in FIG. 3, the sensor controller 4 is disposed on the first substrate SUB1, for example, and is connected to the host device 10 through a flexible circuit board or the like connected to the first substrate SUB.

The input device 3 is provided (disposed) on a surface CVa of the cover member CV. In the present embodiment, the input device 3 includes two conductors (a first conductor and a second conductor) 31a and 31b, and the conductors 31a and 31b are covered with a non-conductor 32. The conductors 31a and 31b are in contact with, for example, the touch panel 2 (cover member CV) in a state in which the input device 3 is disposed on the touch panel 2. That is, in the case in which the input device 3 is disposed on the touch panel 2, the touch panel 2 (sensor controller 4) can detect contact or proximity (i.e., touch) by conductors 31a and 31b included in the input device 3.

In FIG. 3, the case is assumed in which the input device 3 is the input device 3a described above, and the non-conductor 32 is formed in a knob shape. In this case, the input device 3 is formed in a tubular shape extending along the rotation axis O. The conductors 31a and 31b are held by the non-conductor 32 formed in in a knob shape, and are disposed on a part of the circumference around the rotation axis O.

The input device 3 includes a fixed body 33 illustrated in FIG. 3, and is disposed (attached) to the touch panel 2 (front surface CVa) through the fixed body 33.

Although FIG. 3 illustrates an in-cell display device DSP in which the touch panel 2 is built in the display panel PNL, the display device DSP may be an out-cell type or an on-cell type in which the touch panel 2 is provided so as to overlap with the display panel PNL.

In the case in which the input device 3 is disposed on the touch panel 2 as described above, for example, a user operation corresponding to the positions of the conductors 31a and 31b on the touch panel 2 that change by rotating the input device 3 (knob) is detected. Specifically, for example, in the case in which the position of the conductor 31a (or 31b) on the touch panel 2 moves from the first position to the second position, the touch panel 2 (sensor controller 4) can detect the operation of rotating the input device 3 such that the position of the conductor 31a on the touch panel 2 moves from the first position to the second position.

Here, the input device 3 of the present embodiment may be directly (i.e., with bare hands) operated by a user finger, for example. However, it is also assumed that the input device 3 is operated by a non-conductive material such as a globe. Since it is complicated to perform different operations (touch detection operations) between the case in which a finger directly operates and the case in which a globe or the like operates, in the present embodiment, the conductors 31a and 31b are not electrically connected to the outside of the input device 3.

However, a user operation on the input device 3 (i.e., the positions of the conductors 31a and 31b on the touch panel 2) is detected based on a change in the self-capacitance of the drive electrode 21 when the conductors 31a and 31b come into contact or come close to the touch panel 2, as described above. In the case in which the conductors 31a and 31b are not electrically connected to the outside, detection values (sensor signals) for the conductors 31a and 31b decrease, which causes error detection.

Therefore, in the present embodiment, a resonance circuit including the conductors 31a and 31b is manufactured disposed in the inside of the input device 3, and the touch detection operation is performed based on a potential change due to resonance generated by electric field coupling.

Figure 4:
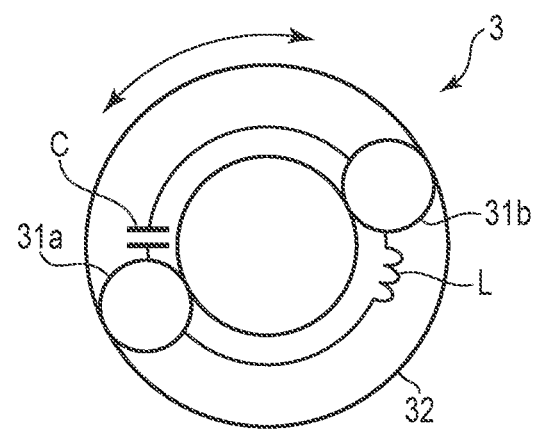
FIG. 4 is a diagram illustrating an example of the planar structure of the input device.

FIG. 4 illustrates an example of the planar structure of the input device 3 (input device 3a). As illustrated in FIG. 4, a resonance circuit (LC circuit) including the conductors 31a and 31b, an inductor L, and a capacitor C is provided in the inside of the input device 3 (non-conductor 32) in the present embodiment. In the present embodiment, when the input device 3 is disposed on the touch panel 2, the conductors 31a and 31b are capacitively coupled to the drive electrode 21 disposed at a position facing the conductors 31a and 31b.

Next, referring to FIG. 5, an example of the circuit configuration of the resonance circuit provided in the inside of the input device 3 will be described.

Figure 5:
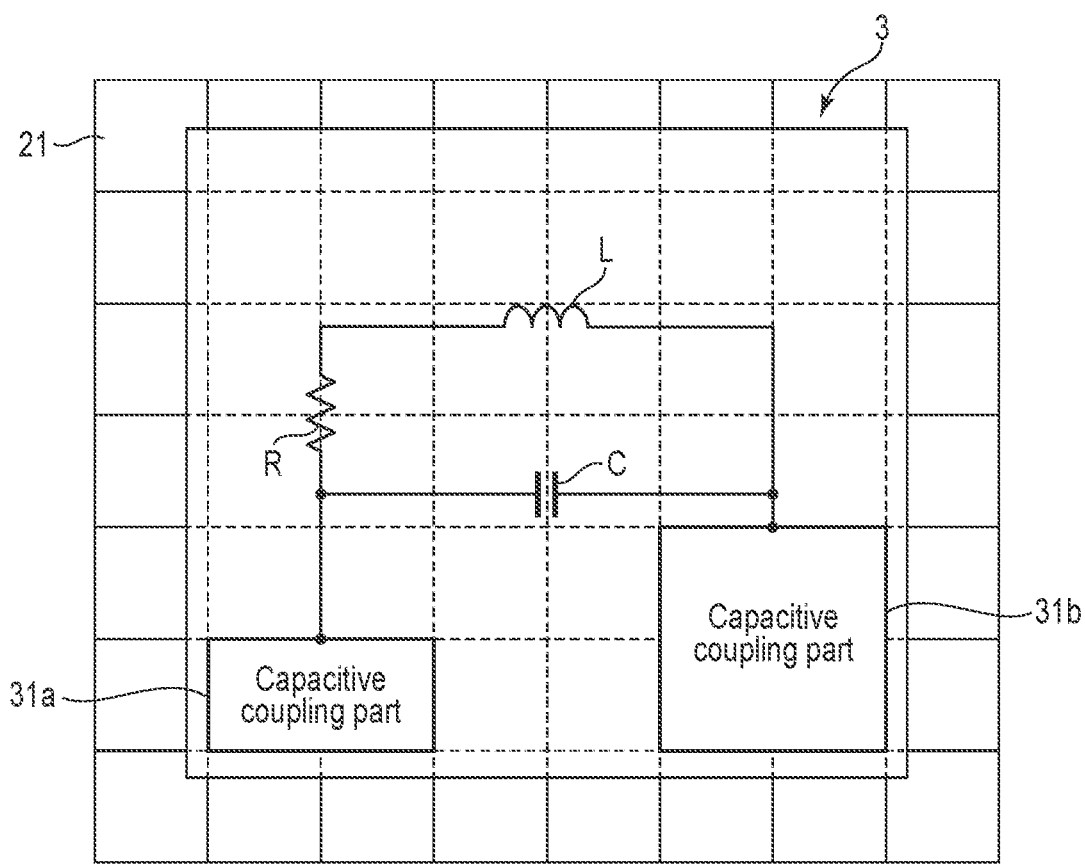
FIG. 5 is a diagram describing an example of the circuit configuration of a resonance circuit provided in the inside of the input device.

As illustrated in FIG. 5, the conductors 31a and 31b included in the input device 3 function as capacitive coupling parts that are capacitively coupled to the drive electrode 21 of the touch panel 2 when a voltage is applied to the drive electrode 21. In the example illustrated in FIG. 5, although the sizes of the capacitive coupling parts (areas of the conductors 31a and 31b in contact with or in proximity to the touch panel 2) are different, the sizes of the capacitive coupling parts may be the same.

In the resonance circuit provided in the inside of the input device 3, the inductor L and the capacitor C are connected in parallel between the conductors 31a and 31b. In the resonance circuit illustrated in FIG. 5, a resistor R is further provided.

In the present embodiment, for example, a change (movement) in the position of the capacitive coupling part to the touch detection region 2a (drive electrode 21) when the user operates the input device 3 is detected through such a resonance circuit. Note that a change in the area (i.e., the contact area) of the capacitive coupling part may be detected.

In the following, referring to FIG. 6, the basic principle of the touch detection operation using the resonance circuit provided in the inside of the input device 3 will be described. In the resonance circuit illustrated in FIG. 6, the resistor R is omitted.

In the present embodiment, since the self-capacitive touch detection (operation) is performed, the drive electrode 21 is alternately connected to a predetermined voltage Vdd and a detector 23 through a switch 22 as illustrated in FIG. 6 (i.e., the connection is switched).

In FIG. 6, the operation of the resonance circuit in the case in which a voltage is applied to the drive electrode 21 disposed at a position facing the conductor 31b will be described. In this case, the voltage of the conductor 31a (capacitive coupling part) is V1, the voltage of the conductor 31b (capacitive coupling part) is V2, and the voltage of the drive electrode 21 is V3. In the present embodiment, since the plurality of drive electrodes 21 is sequentially driven, the conductor 31a is connected to the GND in the case in which a voltage is applied to the drive electrode 21 disposed at a position facing the conductor 31b.

In such a resonance circuit, resonance occurs, for example, in the case in which one of the drive electrodes 21 disposed at positions facing the capacitive coupling parts (conductors 31a and 31b) is taken as a reference and the other swings at a resonance frequency. In the case in which resonance occurs in the resonance circuit, the conductors 31a and 31b resonate in opposite phases.

As illustrated in FIG. 6, the capacitance (electrostatic capacitance) between the conductor 31a and the electrode on the touch panel 2 side is C1, the capacitance of the capacitor C included in the resonance circuit is C2, and the capacitance between the conductor 31b and the drive electrode 21 disposed at a position facing the conductor 31b is C3. The capacitance on the detector 23 side is C4.

Figure 7:
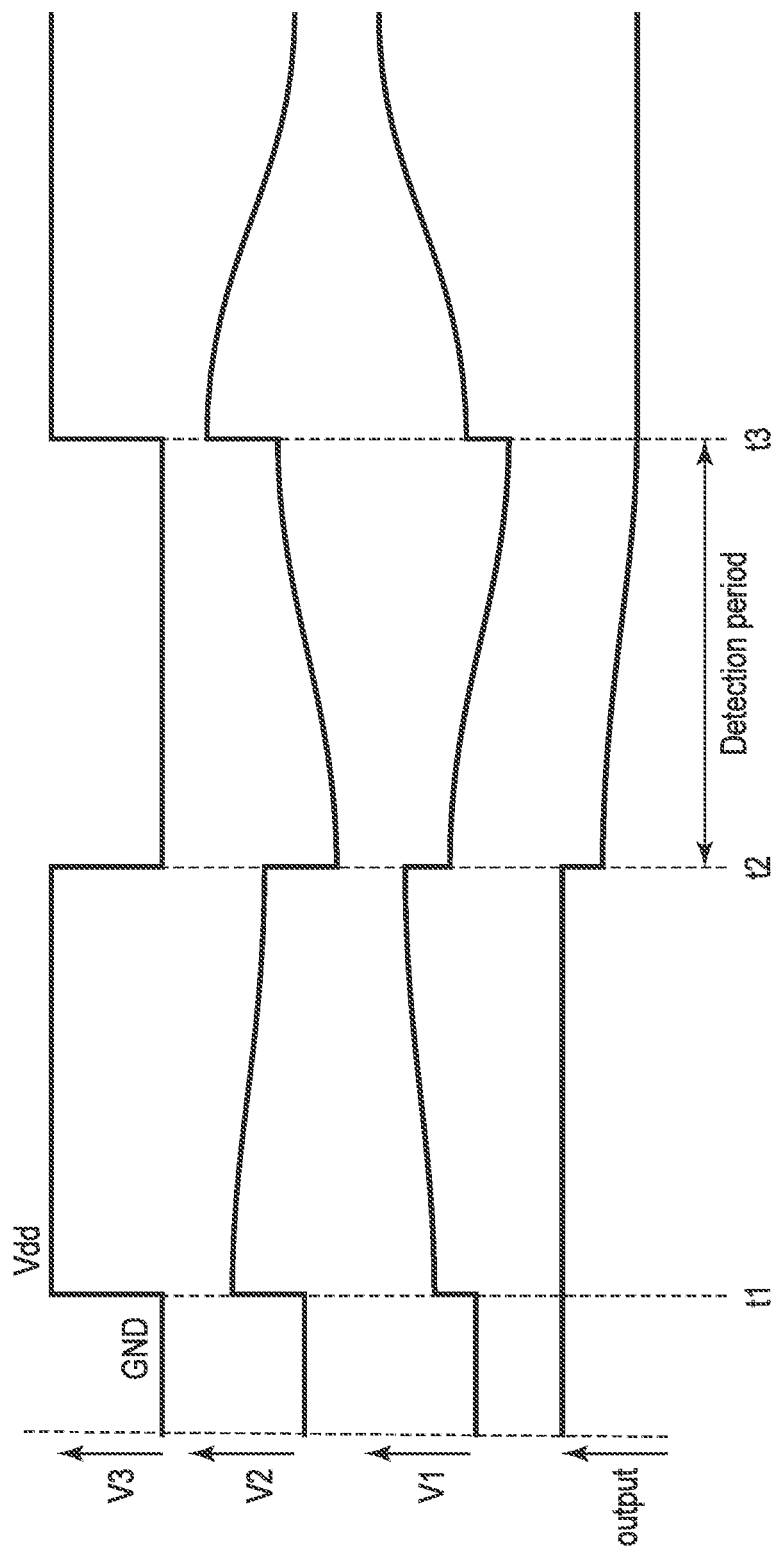
FIG. 7 is a diagram illustrating an example of a relationship between voltages at the time of the touch detection operation and detection values output from a detector.

Here, FIG. 7 illustrates an example of a relationship between the voltages V1 to V3 and the detection value (output) output from the detector 23 in the above-described touch detection operation.

Since no current flows through the inductor L of the resonance circuit at the moment when the switch 22 is switched to Vdd at time t1 in the touch detection operation, a potential difference is generated between V1 and V2 by the capacitance distribution of the system of GND-C1-C2-C3-Vdd.

Subsequently, since a potential difference is generated between V1 and V2, a current starts to flow through the inductor L in the period from time t1 to time t2 (i.e., resonance starts at a resonance frequency determined by the inductor L and the capacitor C).

At time t2 (i.e., a half the period of resonance), the direction of the voltage across V2 and V1 is opposite to that at time t1.

In the case in which the switch 22 is switched from Vdd to the side of the detector 23 at time t2, the potential of the drive electrode 21 disposed at the position facing the conductor 31b is lowered to GND, and thus a potential difference is generated between V1 and V2 by capacitance distribution similarly to the case in which the switch 22 is switched to Vdd at time t1. The potential difference generated at this time is a potential difference opposite at time t1. In the resonance circuit in the present embodiment, these potential differences overlap with each other, and this increases the potential difference between V1 and V2.

In the detector 23, the electric charges charged in the system of the drive electrode 21 are charged to C4 at the moment when the switch 22 is switched to the detector 23 side at time t2. The potential on the output side of the detector 23 is directed in a negative direction. In the period from time t2 to time t3, since V2 gradually increases, C4 is further charged with electric charges. Note that a period from time t2 to time t3 illustrated in FIG. 7 corresponds to a detection period of touch detection.

Figure 8:
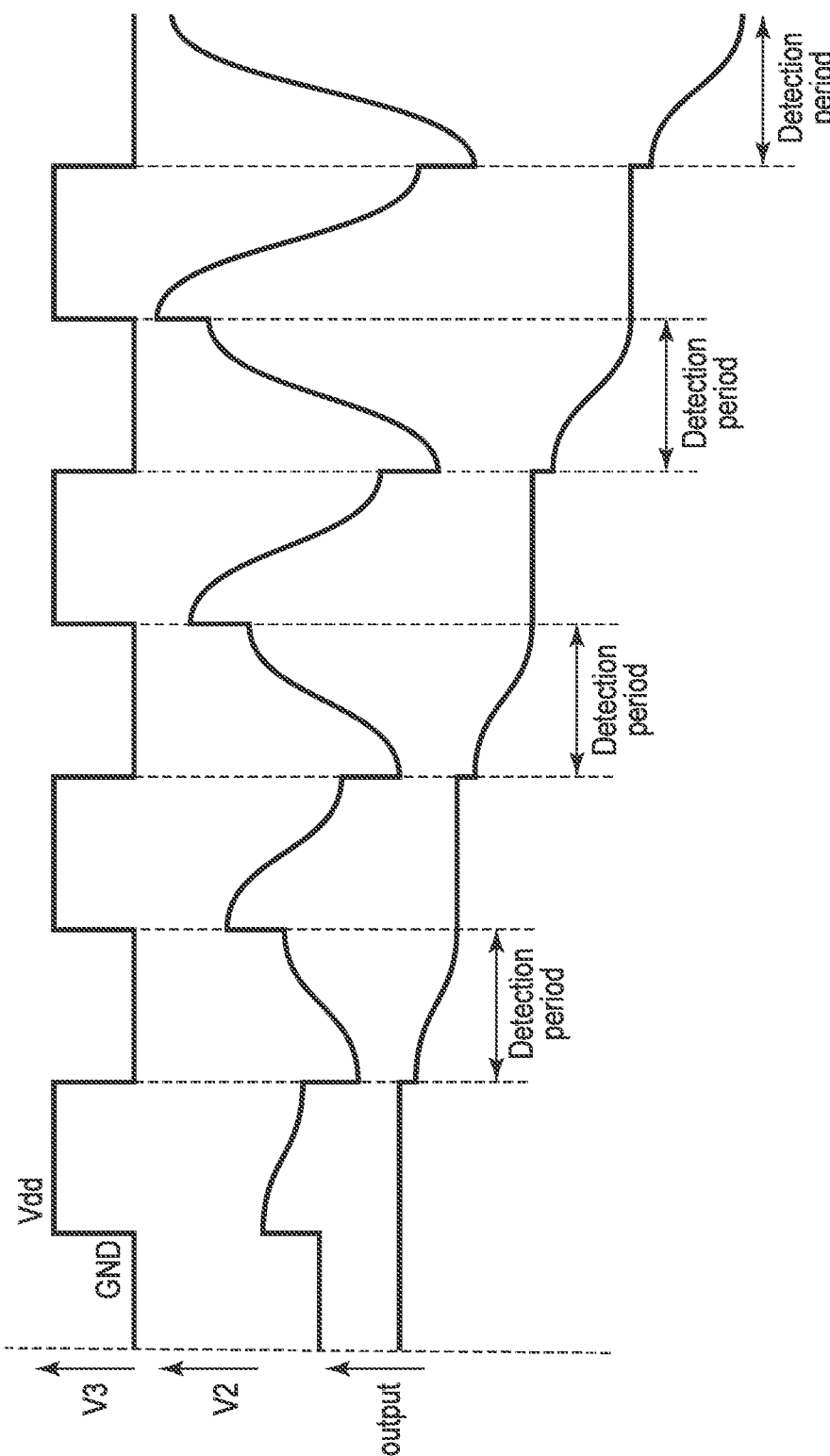
FIG. 8 is a diagram illustrating an example of detection values in the touch detection operation.

As illustrated in FIG. 8, the above-described operation is repeated to increase the amplitude of resonance in the resonance circuit increases, and the electric charges charged in the detector 23 per detection increase.

Here, the case is described in which a voltage is applied (i.e., the drive electrode 21 is driven at the resonance frequency) to the drive electrode 21 facing the conductor 31b based on the resonance frequency. However, a similar operation is performed also in the case in which a voltage is applied to the drive electrode 21 facing the conductor 31a.

Figure 10:
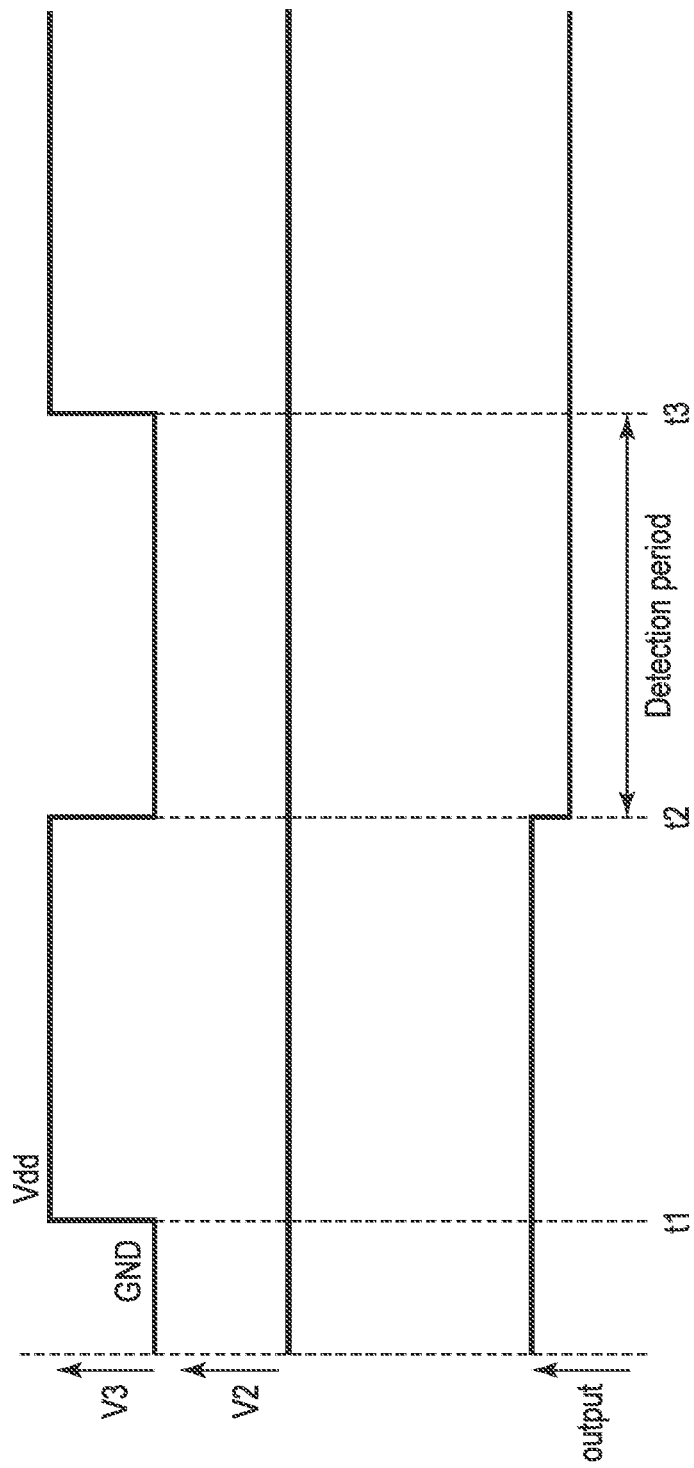
FIG. 10 is a diagram describing the case in which a user finger is present at a position facing the drive electrodes.

Next, referring to FIGS. 9 and 10, the case will be briefly described in which a user finger is present at a position facing the drive electrodes 21 (i.e., the drive electrode 21 and the GND hold the capacitance). In FIGS. 9 and 10, the same components as those in FIGS. 6 to 8 are designated with the same reference numerals.

Figure 11:
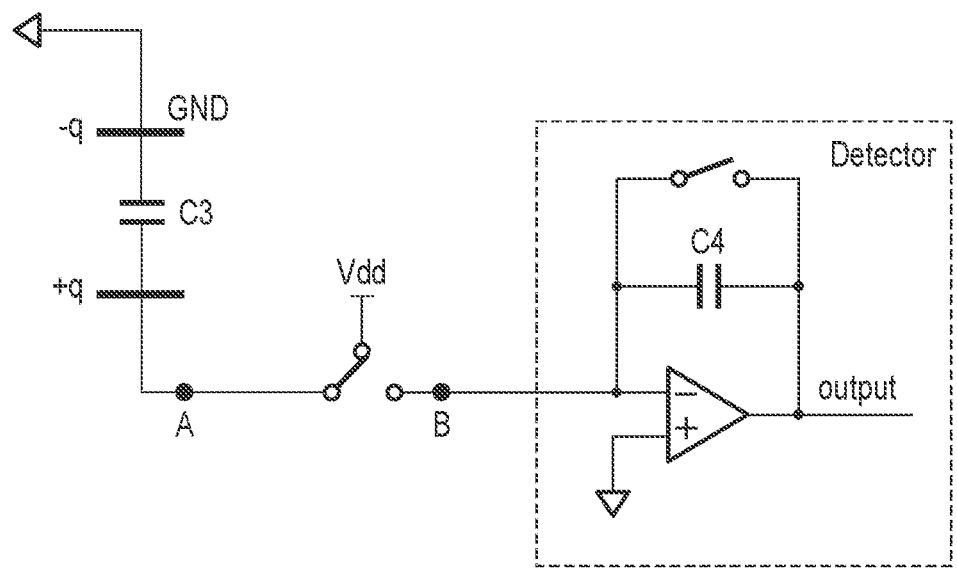
FIG. 11 is a diagram illustrating a state in which electric charges are stored in the system of the drive electrode.

When the switch 22 is connected to the Vdd side at time t1 illustrated in FIG. 10, electric charges are charged in the system of the drive electrode 21 in a period from time t1 to time t2. FIG. 11 illustrates a state in which charge q is stored in C3 (system A) when the switch 22 is connected to Vdd.

Figure 12:
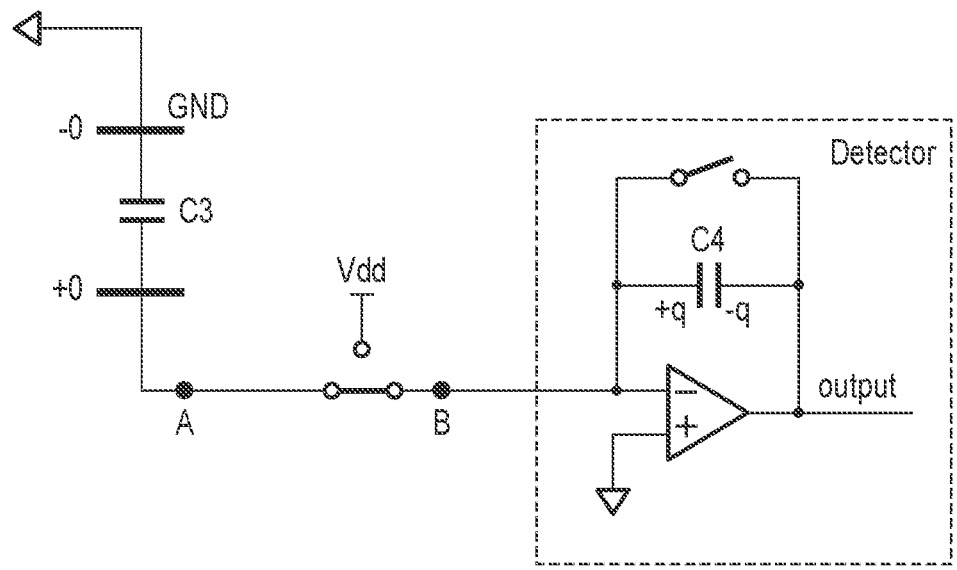
FIG. 12 is a diagram illustrating a state in which electric charges are stored in the system of the detector.

Subsequently, in the case in which the switch 22 is connected to the detector 23 side at time t2, the potential of the system of the drive electrode 21 becomes GND due to an imaginary short. At this time, since there is no potential difference, C3 has no charge. Therefore, the charged charge q is charged to C4, and a potential difference is generated between both ends of C4. FIG. 12 illustrates a state in which the charge q is stored in C4 (system of B) when the switch 22 is connected to the detector 23.

In the case in which the drive electrode 21 and the GND hold capacitance, negative electric charges are charged by repeating the above-described operation.

Even in the case in which the capacitive coupling part capacitively coupled to the drive electrode 21 is not GND, when a potential difference is generated at both ends of C3, electric charges are similarly charged.

That is, for example, even in a configuration in which a resonance circuit is not provided in the inside of the input device 3 and the input device 3 holds only a conductor, although electric charges can be charged, a detection value in this case is small.

On the other hand, in the present embodiment, the detection value can be increased with the configuration in which the resonance circuit including the conductors 31a and 31b is provided in the inside of the input device 3 as described above.

Here, the touch panel 2 generally detects a change from a state when the power of the touch panel 2 is turned on (i.e., at the time of startup). For this reason, in the case in which the input device 3 is already disposed on the touch panel 2 at the time point at which the power of the touch panel 2 is turned on, the initial state (i.e., the initial positions of the conductors 31a and 31b) of the input device 3 fails to be detected.

However, in the present embodiment, with the configuration in which the resonance circuit is provided in the inside of the input device 3, for example, even in a state in which the input device 3 (i.e., the conductors 31a and 31b) is disposed at the same position, the detection value is different between the case in which the touch detection operation is performed based on the non-resonance frequency and the case in which the touch detection operation is performed based on the resonance frequency.

In the following, referring to FIG. 13, a difference in detection values will be described in the case in which the drive electrode 21 disposed at a position facing the conductor 31a or 31b is driven at a non-resonance frequency and a resonance frequency. The upper part of FIG. 13 illustrates the case in which the drive electrode 21 is driven at the non-resonance frequency (i.e., the voltage is applied to the drive electrode 21 at the non-resonance frequency), and the lower part of FIG. 13 illustrates the case in which the drive electrode 21 is driven at the resonance frequency (i.e., the voltage is applied to the drive electrode 21 at the resonance frequency).

Figure 13:
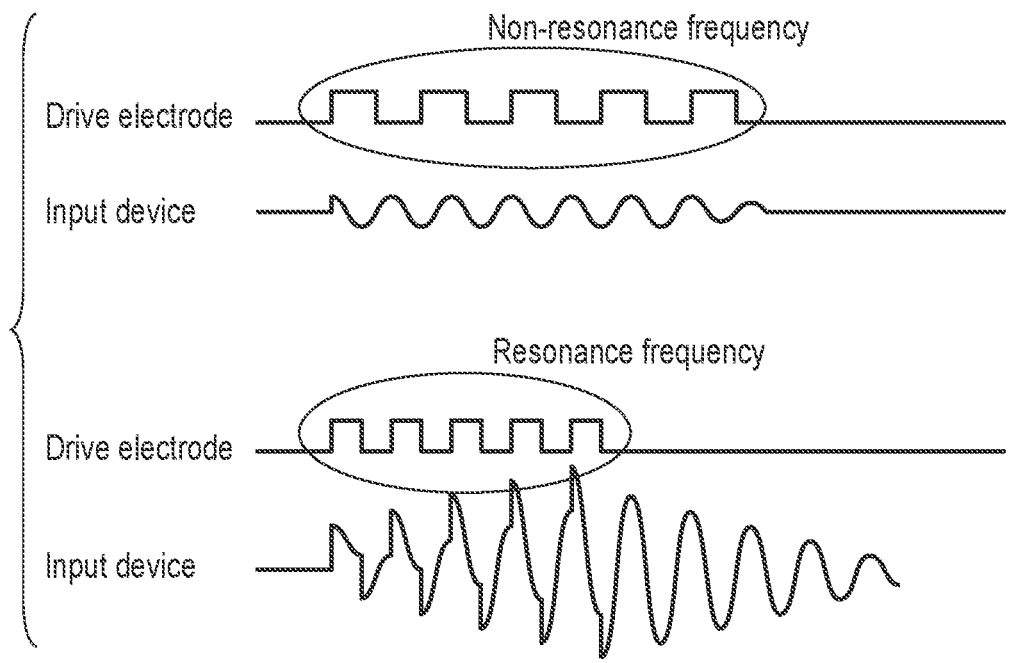
FIG. 13 is a diagram describing a difference between detection values in the case in which the drive electrode is driven at a non-resonance frequency and a resonance frequency.

As illustrated in the upper part of FIG. 13, in the case in which the drive electrode 21 is driven at a frequency (i.e., the non-resonance frequency) different from the resonance frequency of the resonance circuit (input device 3), the resonance in the resonance circuit is reduced, and thus the detection value is reduced. On the other hand, in the case in which the drive electrode 21 is driven at the resonance frequency of the resonance circuit, the input device 3 side resonates and the detection value increases.

Although the waveform of the input device 3 illustrated in the upper part of FIG. 13 is not accurate, in the case in which drive electrode 21 is driven at the non-resonance frequency, the amplitude is smaller than the waveform of the input device 3 in the case in which drive electrode 21 is driven at the resonance frequency illustrated in the lower part of FIG. 13.

In the present embodiment, with the use of the fact that different detection values are obtained between the touch detection operation based on the non-resonance frequency and the touch detection operation based on the resonance frequency as described above, the initial state of the input device 3 (the initial positions of the conductors 31a and 31b) is detected when the power of the touch panel 2 (the display device DSP on which the sensor device 1 is mounted) is turned on.

Figure 14:
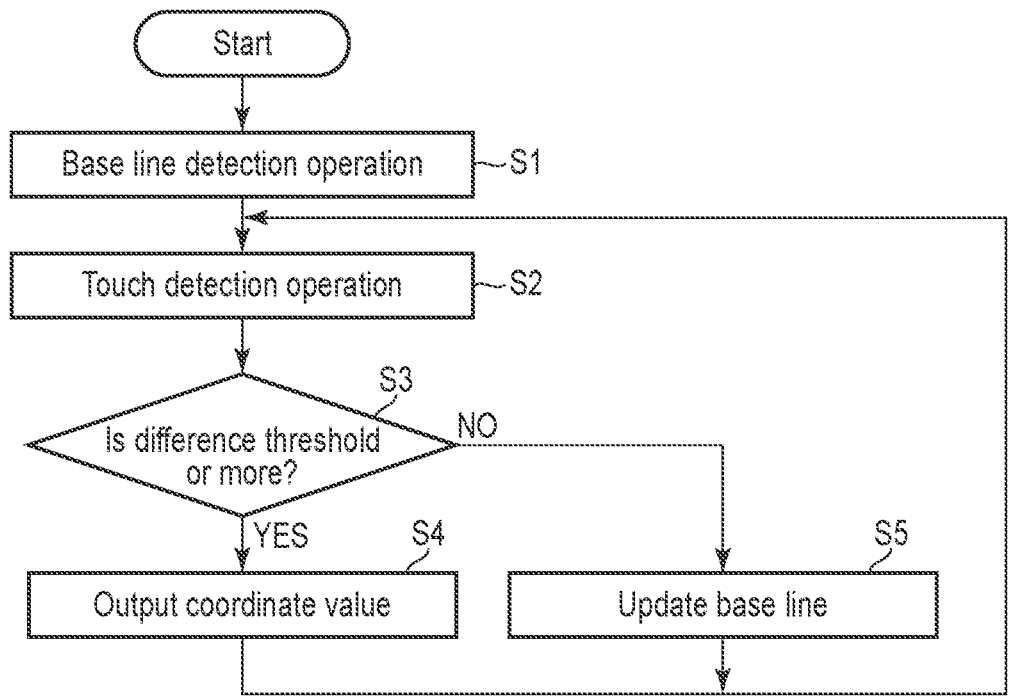
FIG. 14 is a flowchart illustrating an example of a first process of a sensor controller.

In the following, an example of a process procedure of the sensor controller 4 when a user operation is detected will be described with reference to a flowchart of FIG. 14. The process illustrated in FIG. 14 is executed when the touch panel 2 is turned on. In the following, the process illustrated in FIG. 14 is referred to as a first process of the sensor controller 4 for convenience.

In the case in which the touch panel 2 is turned on, the sensor controller 4 performs a baseline detection operation (Step S1). In this base line detection operation, a voltage is applied (i.e., the plurality of drive electrodes 21 is driven at the resonance frequency) to the plurality of drive electrodes 21 included in the touch panel 2 based on the non-resonance frequency, and thus a detection value in each drive electrode 21 is acquired as a base line.

When the process in Step S1 is executed, the sensor controller 4 performs a touch detection operation (Step S2). In the touch detection operation, a voltage is applied (i.e., the plurality of drive electrodes 21 is driven at the resonance frequency) to the plurality of drive electrodes 21 included in the touch panel 2 based on the resonance frequency, and thus a detection value (in the following, referred to as a detection line) in each drive electrode 21 is acquired.

Subsequently, the sensor controller 4 calculates a difference (Diff) between the detection line acquired by executing the process in Step S2 and the baseline acquired by executing the process in Step S1.

Here, as described above, in the case in which the input device 3 is disposed on the touch panel 2 at the time when the power of the touch panel 2 is turned on, the detection value (detection value in the drive electrode 21 disposed at the position facing the conductors 31a and 31b) acquired in the base line detection operation based on the non-resonance frequency is different from the detection value (detection value in the drive electrode 21 disposed at the position facing the conductors 31a and 31b) acquired in the touch detection operation based on the resonance frequency.

Therefore, in the present embodiment, the difference between the detection line and the baseline is calculated as described above, the position of the drive electrode 21 at which different detection values are acquired between the case in which the baseline detection operation is performed and the case in which the touch detection operation is performed can be detected as the positions of the conductors 31a and 31b. In this case, for example, the position of the drive electrode 21 at which the detection value in which the difference is equal to or larger than a predetermined value (in the following, referred to as a threshold) is acquired is detected. The positions of the conductors 31a and 31b detected in this manner are represented by coordinate values on the touch panel 2 (touch detection region 2a).

Here, the sensor controller 4 determines whether the difference between the detection line and the baseline calculated as described above is equal to or larger than a threshold (i.e., whether the input device 3 is disposed on the touch panel 2) (Step S3).

In the case in which it is determined that the difference is equal to or larger than a threshold (YES in Step S3), the sensor controller 4 detects the position (i.e., positions of conductors 31a and 31b included in the input device 3) of the drive electrode 21 at which the detection value in which the difference is equal to or larger than the threshold is acquired, and outputs the position (coordinate value) to, for example, the host device 10 (Step S4). When the process in Step S4 is executed, the process returns to Step S2 and the process is repeated.

Here, although the baseline described above is necessary for detecting an object in contact with or in proximity to the touch panel 2, the detection value (detection line) in the touch detection operation may change according to, for example, a change in an environment. Therefore, preferably, the baseline compared with the detection line is periodically updated.

Therefore, in the case in which it is determined in Step S3 that the difference is not the threshold or more (NO in Step S3), the sensor controller 4 updates the baseline detected in Step S1 (Step S5). In this case, the sensor controller 4 sets the detection line acquired by executing the process in Step S2 as the baseline. When the process in Step S5 is executed, the process returns to Step S2 described above, and the process is repeated.

Assuming that the detection line is a baseline in the case in which the input device 3 is detected, for example, in the case in which the input device 3 is not operated (i.e., the positions of the conductors 31a and 31b do not change), the detection line similar to the baseline is acquired, and the positions of the conductors 31a and 31b fail to be detected from the difference.

Therefore, in the case in which it is determined in Step S3 that the difference is equal to or larger than the threshold value, the process in Step S5 (i.e., the update process of the base line) is not executed.

Here, the description is mainly given assuming that the initial state of the input device 3 is detected when the power of the touch panel 2 is turned on. However, for example, after the process in Step S21 is executed, it is also possible to detect the position (contact position) of the user finger to the extra input device region 2c (region other than the input device region 2b).

That is, even in the case in which a user finger operates the touch panel 2 (extra input device region 2c), the difference between the detection line and the baseline is equal to or larger than the threshold, and the position of the user finger is detected.

According to this, in the first process of the sensor controller 4 illustrated in FIG. 14, the process in Step S4 is executed in the case in which the position of at least one of the input device 3 (conductors 31a and 31b) and the user finger is detected (i.e., the difference between the detection line and the base line is equal to or larger than the threshold), and the process in Step S5 is executed in the case in which neither the position of the input device 3 nor the user finger is detected (i.e., the difference between the detection line and the baseline is not equal to or larger than the threshold).

The first process of the sensor controller 4 described above is continuously repeated until the power of the touch panel 2 (the display device DSP on which the sensor device 1 is mounted) is turned off.

Here, although the process relating to the touch detection operation of detecting a user operation is mainly described in FIG. 14, the sensor controller 4 also performs a display write operation (operation of displaying an image) in addition to the touch detection operation.

In this case, the sensor controller 4 can perform the display write operation and the touch detection operation by time division. According to this, as shown in FIG. 15, a period during which the display write operation is performed (display period) and a period during which the touch detection operation is performed (touch detection period) are alternately provided.

Figure 15:
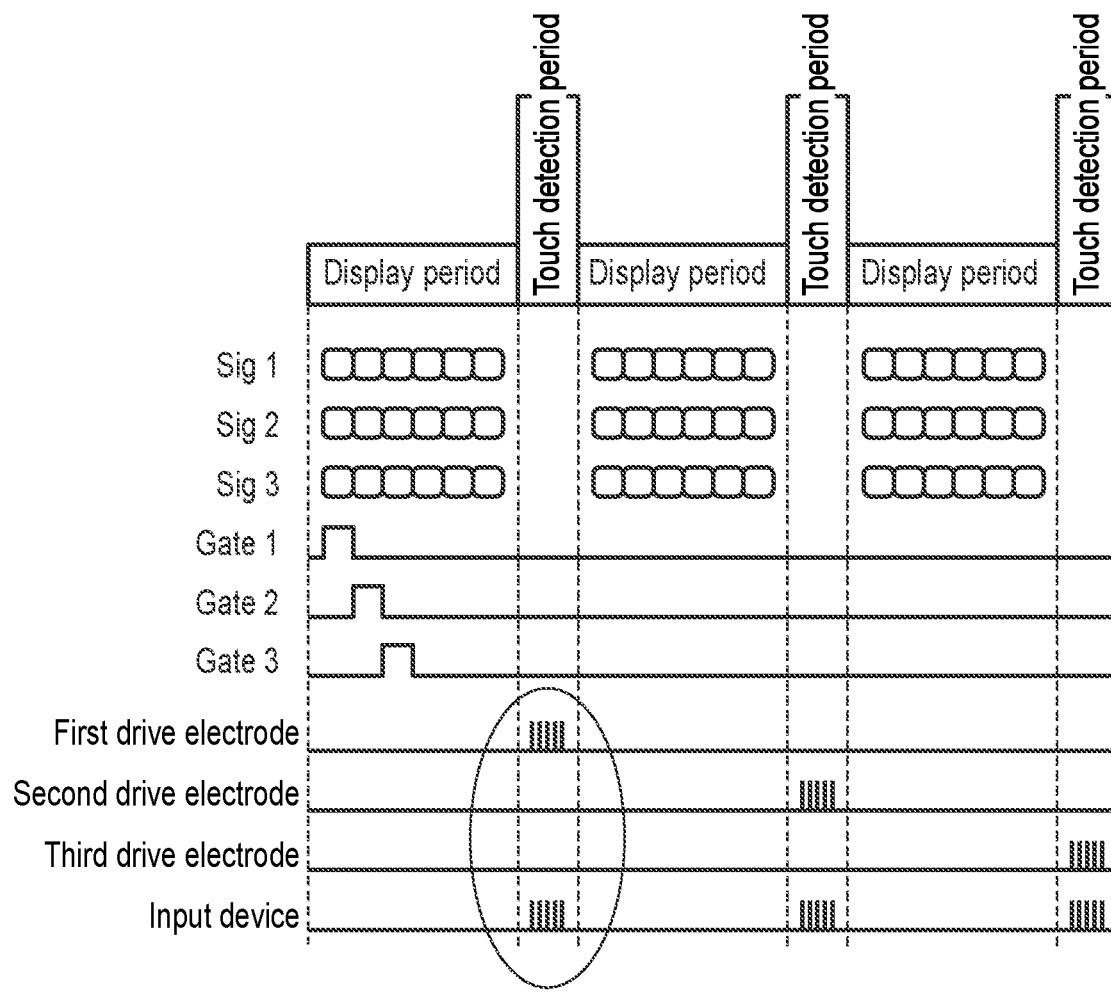
FIG. 15 is a diagram describing that a display write operation and a touch detection operation are performed by time division.

Although only three are illustrated in FIG. 15 for convenience, Sig indicates an image signal written in a plurality of pixels in a display period, and Gate indicates a gate signal supplied to a plurality of pixels (pixel switches) in which the image signal is written in the display period. The image signal Sig and the gate signal Gate are supplied in units of display lines.

FIG. 15 illustrates an example in which, for example, the first drive electrode 21 is driven in the first touch detection period, the second drive electrode 21 is driven in the second touch detection period, and the third drive electrode 21 is driven in the third touch detection period. However, for example, all the drive electrodes 21 may be sequentially driven in one touch detection period. In the present embodiment, since resonance does not occur in the case in which all the drive electrodes 21 are driven at the same amplitude at the same time, the drive electrodes 21 only has to be driven so as to generate at least resonance.

Figure 16:
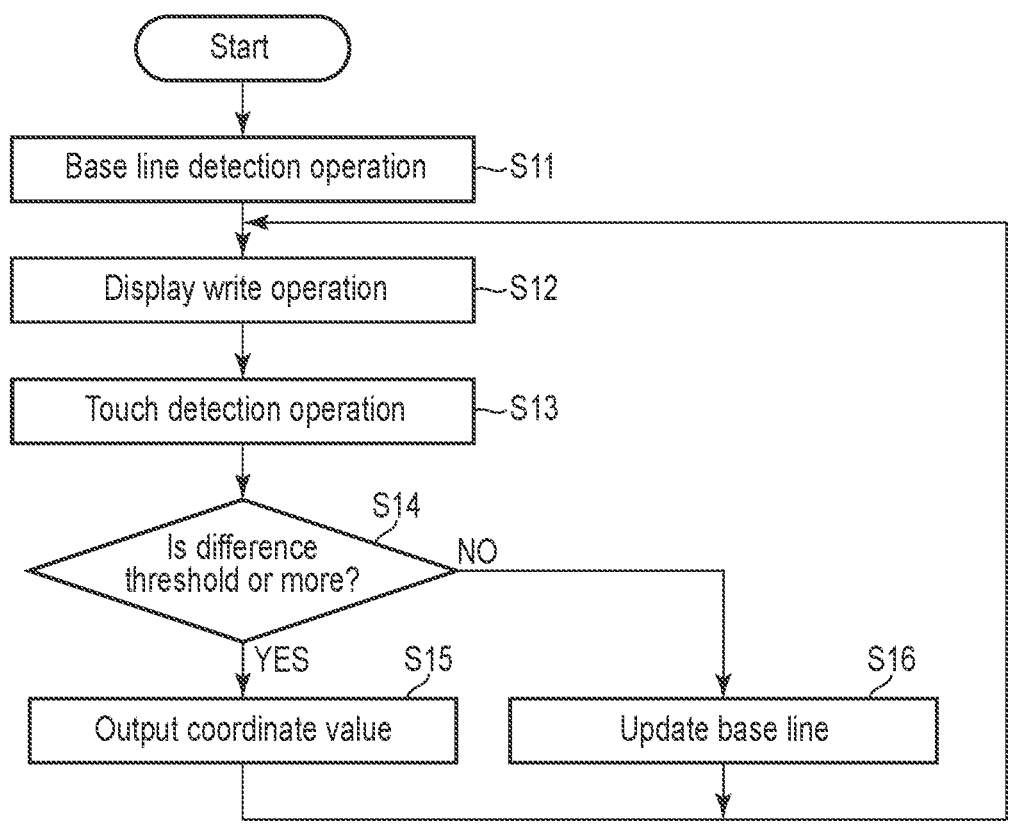
FIG. 16 is a flowchart illustrating an example of a second process of the sensor controller.

Referring to a flowchart of FIG. 16, an example of a process procedure of the sensor controller 4 in the case in which the display write operation and the touch detection operation are performed by time division as described above will be described. Here, differences from the above-described process illustrated in FIG. 14 will be mainly described. In the following description, the process illustrated in FIG. 16 is referred to as a second process of the sensor controller 4 for convenience.

In the case in which the touch panel 2 is turned on, the process in Step S11 corresponding to the process in Step S1 illustrated in FIG. 14 is executed.

Subsequently, the sensor controller 4 performs a display write operation (Step S12). Although not described in detail, in the display write operation, for example, an image signal (pixel signal) is written in a plurality of pixels disposed in the display region of the display device DSP, and thus an image is displayed in the display region.

When the process in Step S12 is executed, processes in Steps S13 to S16 corresponding to the processes in Steps S2 to S5 illustrated in FIG. 14 are executed.

In the case in which the process in Step S15 or S16 is executed, the process returns to Step S12 and the process is repeated.

In the case in which the display write operation and the touch detection operation are performed by time division as described above, for example, the plurality of drive electrodes 21 can be used also as an electrode (common electrode) for image display, and thus it is possible to achieve a reduction in the profile of the display device DSP, and the like.

Here, as described above, preferably, the baseline is periodically updated. However, in the process illustrated in FIGS. 14 and 16 (the first process and the second process of the sensor controller 4), when the state in which the input device 3 is disposed on the touch panel 2 is maintained, the baseline fails to be updated. Since it is also assumed that the input device 3 is continuously used (operated) for a long time, a mechanism that updates the baseline is useful even in a state in which the input device 3 is disposed on the touch panel 2.

Figure 17:
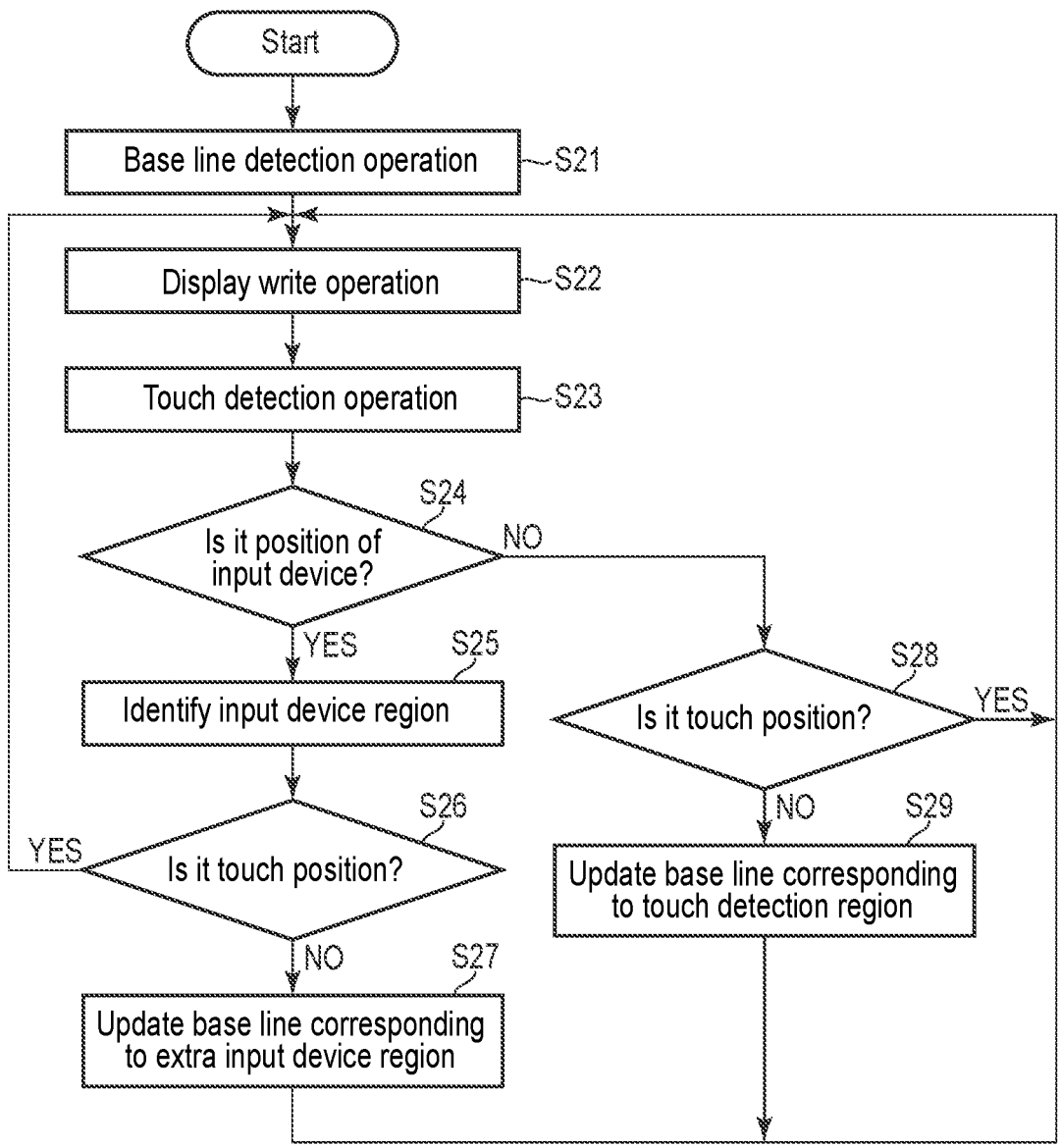
FIG. 17 is a flowchart illustrating an example of a third process of the sensor controller.

In the following, referring to a flowchart of FIG. 17, an example of a process procedure of the sensor controller 4 that updates the baseline in the case in which the input device 3 is disposed on the touch panel 2 will be described. Here, differences from the above-described process illustrated in FIG. 16 will be mainly described. In the following description, the process illustrated in FIG. 17 is referred to as a third process of the sensor controller 4 for convenience.

In the case in which the touch panel 2 is turned on, processes in Steps S21 to S23 corresponding to the processes in Steps S11 to S13 illustrated in FIG. 16 are executed.

In the case in which the process in Step S23 is executed, the difference between the detection line and the baseline is calculated as described above, and the positions of the conductors 31a and 31b provided in the input device 3 or the position of the user finger can be detected based on the difference.

Here, since the detection value in the drive electrode 21 disposed at the position facing the conductors 31a and 31b is based on resonance in the resonance circuit, the detection value is different from the detection value in the drive electrode 21 disposed at the position facing the user finger. Therefore, the sensor controller 4 can determine whether the positions of the conductors 31a and 31b (in the following, the positions are referred to as a position of the input device 3) are detected or the position of the user finger (in the following, referred to as a touch position) is detected based on the difference between the detection line and the baseline. Note that whether to detect the position of the input device 3 or the touch position may be determined by, for example, a pattern of detection values or the like.

Therefore, in the case in which the process in Step S23 is executed, the sensor controller 4 determines whether the position of the input device 3 is detected (Step S24).

In the case in which it is determined that the position of the input device 3 is detected (YES in Step S24), the sensor controller 4 identifies a region (i.e., the input device region 2b) on the touch panel 2 in which the input device 3 is disposed (Step S25). Here, since the positions (coordinate values) of the conductors 31a and 31b included in the input device 3 are detected, in the case in which the conductors 31a and 31b are disposed at the positions on the touch panel 2 corresponding to the coordinate values, the coordinate values and the like of the region occupied by the input device 3 on the touch panel 2 are identified as the input device region 2b.

Subsequently, the sensor controller 4 determines whether a touch position is detected (Step S26).

In the case in which it is determined that no touch position is detected (NO in Step S26), the sensor controller 4 updates the baseline corresponding to the extra input device region 2c (Step S27).

In this case, the sensor controller 4 identifies a region as the extra input device region 2c, which the input device region 2b identified in Step S25 is excluded from the touch detection region 2a. The sensor controller 4 sets, as a baseline corresponding to the extra input device region 2c, a detection value (i.e., the detection line corresponding to the extra input device region 2c) at the drive electrode 21 disposed at a position overlapping with the extra input device region 2c among the detection values acquired by executing the process in Step S23.

In the case in which the process in Step S27 is executed, although the baseline corresponding to the extra input device region 2c is updated, the baseline corresponding to the input device region 2b is not updated.

When the process in Step S27 is executed, the process returns to Step S22 and the process is repeated. On the other hand, in the case in which it is determined that the touch position is detected (YES in Step S26), the process in Step S27 is not executed, and the process returns to Step S22 and is repeated.

In the case in which it is determined in Step S24 described above that the position of the input device 3 is not detected (NO in Step S24), the sensor controller 4 determines whether a touch position is detected (Step S28).

In the case in which it is determined that no touch position is detected (NO in Step S28), the sensor controller 4 updates the baseline corresponding to all the touch detection regions 2a (Step S29). The process in Step S29 corresponds to the process in Step S16 (Step S5 illustrated in FIG. 14) illustrated in FIG. 16 described above, and the sensor controller 4 sets the detection line acquired by executing the process in Step S23 as the baseline. When the process in Step S29 is executed, the process returns to Step S22 and the process is repeated.

In the case in which it is determined in Step S28 that the touch position is detected (YES in Step S28), the process returns to Step S22 and the process is repeated.

According to the third process of the sensor controller 4 illustrated in FIG. 17, even in the case in which the position of the input device 3 is detected (i.e., the input device 3 is disposed on the touch panel 2), in the case in which the touch position is not detected, the baseline corresponding to the extra input device region 2c can be updated. In the case in which both the position of the input device 3 and the touch position are not detected, the base line corresponding to the touch detection region 2a is updated.

According to this, the update of the base line is distinguished between the region in which the input device 3 is disposed (input device region 2b) and the region other than the region (extra input device region 2c), and thus the base line corresponding to the region in which the touch position (i.e., the position of the user finger) is detected can be updated even in the case in which the input device 3 is continuously disposed.

Although not illustrated in FIG. 17, the position or touch position of the input device 3 (conductors 31a and 31b) detected by execution of the process in Step S23 is output to the host device 10 or the like at an arbitrary timing, for example.

Here, in the case in which the third process of the sensor controller 4 is executed, it is possible to update the baseline corresponding to the extra input device region 2c. However, it is not possible to update the baseline corresponding to the input device region 2b while the input device 3 is continuously disposed.

Figure 18:
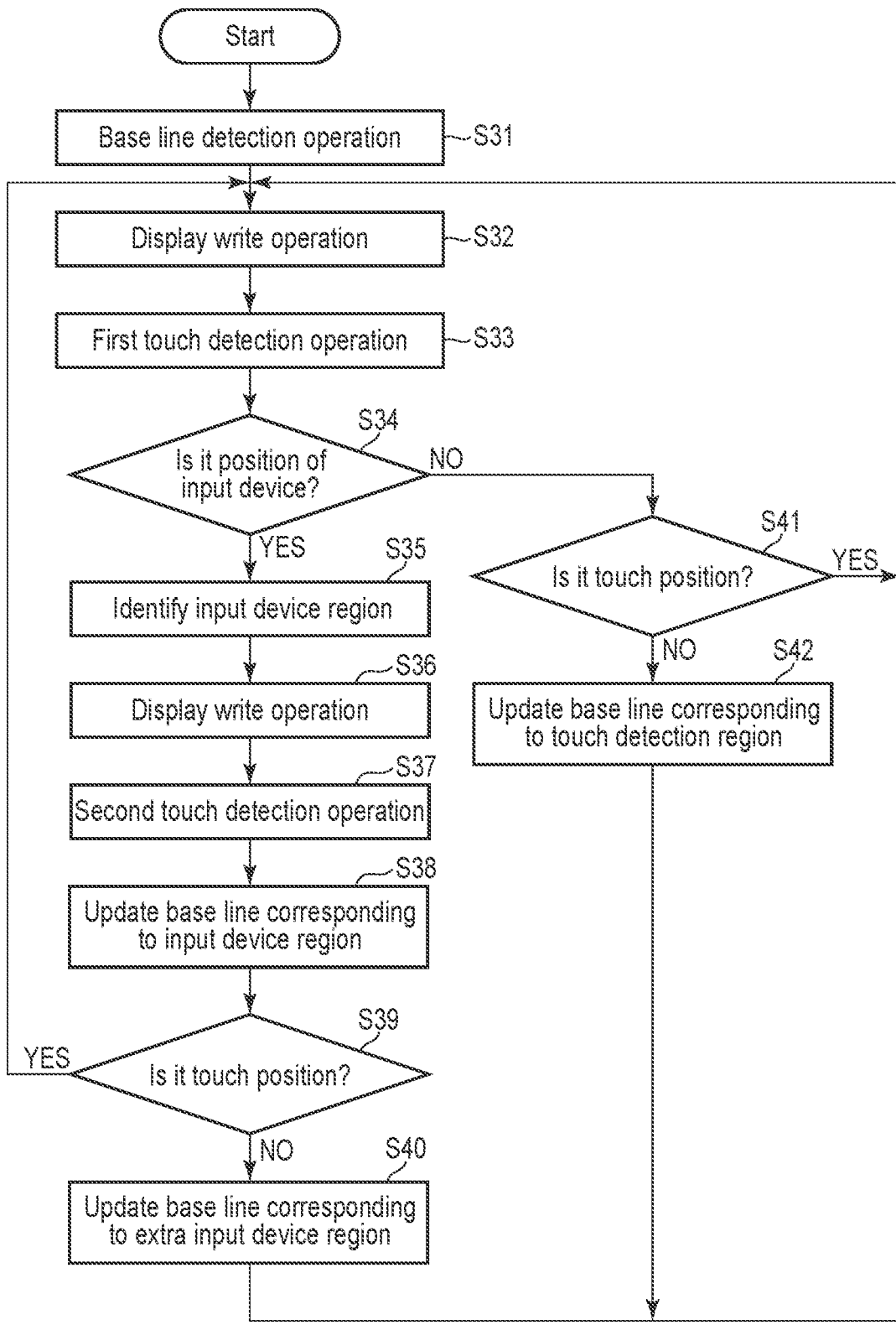
FIG. 18 is a flowchart illustrating an example of a fourth process of the sensor controller.

In the following, referring to a flowchart of FIG. 18, an example of a process procedure of the sensor controller 4 that updates the baseline corresponding to the input device region 2b will be described. Here, differences from the above-described process illustrated in FIG. 17 will be mainly described. In the following description, the process illustrated in FIG. 18 is referred to as a fourth process of the sensor controller 4 for convenience.

In the case in which the touch panel 2 is turned on, the processes in Steps S31 to S35 corresponding to the processes in Steps S21 to S25 illustrated in FIG. 17 are executed. In the description of FIG. 18, the touch detection operation performed in Step S33 is referred to as a first touch detection operation for convenience.

When the process in Step S35 is executed, the sensor controller 4 performs a display write operation (Step S36). The process in Step S36 is similar to the process in Step S32.

Subsequently, the sensor controller 4 performs a second touch detection operation (Step S37). In the first touch detection operation in Step S33 described above, the plurality of drive electrodes 21 is driven at the resonance frequency. However, in the second touch detection operation in Step S37, the plurality of drive electrodes 21 is driven at the non-resonance frequency. As a result, the sensor controller 4 acquires a detection value in each drive electrode 21 driven at the non-resonance frequency as a detection line.

In the case in which the second touch detection operation is performed, the touch position can be detected based on a difference between the detection line acquired by executing the process in Step S37 and the base line acquired by executing the process in Step S31. On the other hand, since the plurality of drive electrodes 21 is driven at the non-resonance frequency in the baseline detection operation and the second touch detection operation, the position of the input device 3 fails to be detected in the second touch detection operation.

When the process in Step S37 is executed, the sensor controller 4 updates the baseline corresponding to the input device region 2b (Step S38). In this case, the sensor controller 4 sets, as a baseline corresponding to the input device region 2b, a detection value (i.e., the detection line corresponding to the input device region 2b) in the drive electrode 21 disposed at a position overlapping with the input device region 2b identified in Step S37 among the detection values acquired by executing the process in Step S35.

Subsequently, processes in Steps S39 and S40 corresponding to the processes in Steps S26 and S27 illustrated in FIG. 17 are executed. The extra input device region 2c in Step S40 is a region, which the input device region 2b identified in Step S35 is excluded from the touch detection region 2a.

In the case in which it is determined in Step S39 that the touch position is detected (YES in Step S39), the process in Step S40 is not executed, and the process returns to Step S32 and is repeated. In the case in which Step S40 is executed, the process returns to Step S32 and the process is repeated.

In the case in which it is determined in Step S34 that the position of the input device 3 is not detected (NO in Step S34), processes in Steps S41 and S42 corresponding to the processes in Steps S28 and S29 illustrated in FIG. 17 are executed.

In the case in which it is determined in Step S41 that the touch position is detected (YES in Step S41) or in the case in which the process in Step S42 is executed, the process returns to Step S32 and the process is repeated.

According to the fourth process of the sensor controller 4 illustrated in FIG. 18, in the case in which the position of the input device 3 is detected (i.e., the input device 3 is disposed on the touch panel 2), the base line corresponding to the input device region 2b is updated by the detection value (detection line) acquired by driving the plurality of drive electrodes 21 at the non-resonance frequency.

That is, the touch detection operation is separately performed for the drive to cause resonance and the drive not to cause resonance, it is possible to update the baseline corresponding to the input device region 2b even in the case in which the input device 3 is continuously disposed.

In the example illustrated in FIG. 18, the first touch detection operation (touch detection at the resonance frequency) based on the resonance frequency and the second touch detection operation (touch detection at the non-resonance frequency) based on the non-resonance frequency are alternately performed. However, for example, one second touch detection operation (update of the base line) may be performed for n (n is an integer of 2 or more) times of the first touch detection operations (position detection of the input device 3). As described above, since the position of the input device 3 can be detected during the first touch detection operation, and the touch position can be detected during the first touch detection operation and the second touch detection operation, the report rate of the position detection of the input device 3 in this case is n/(n+1) of the detection of the touch position.

Figure 19:
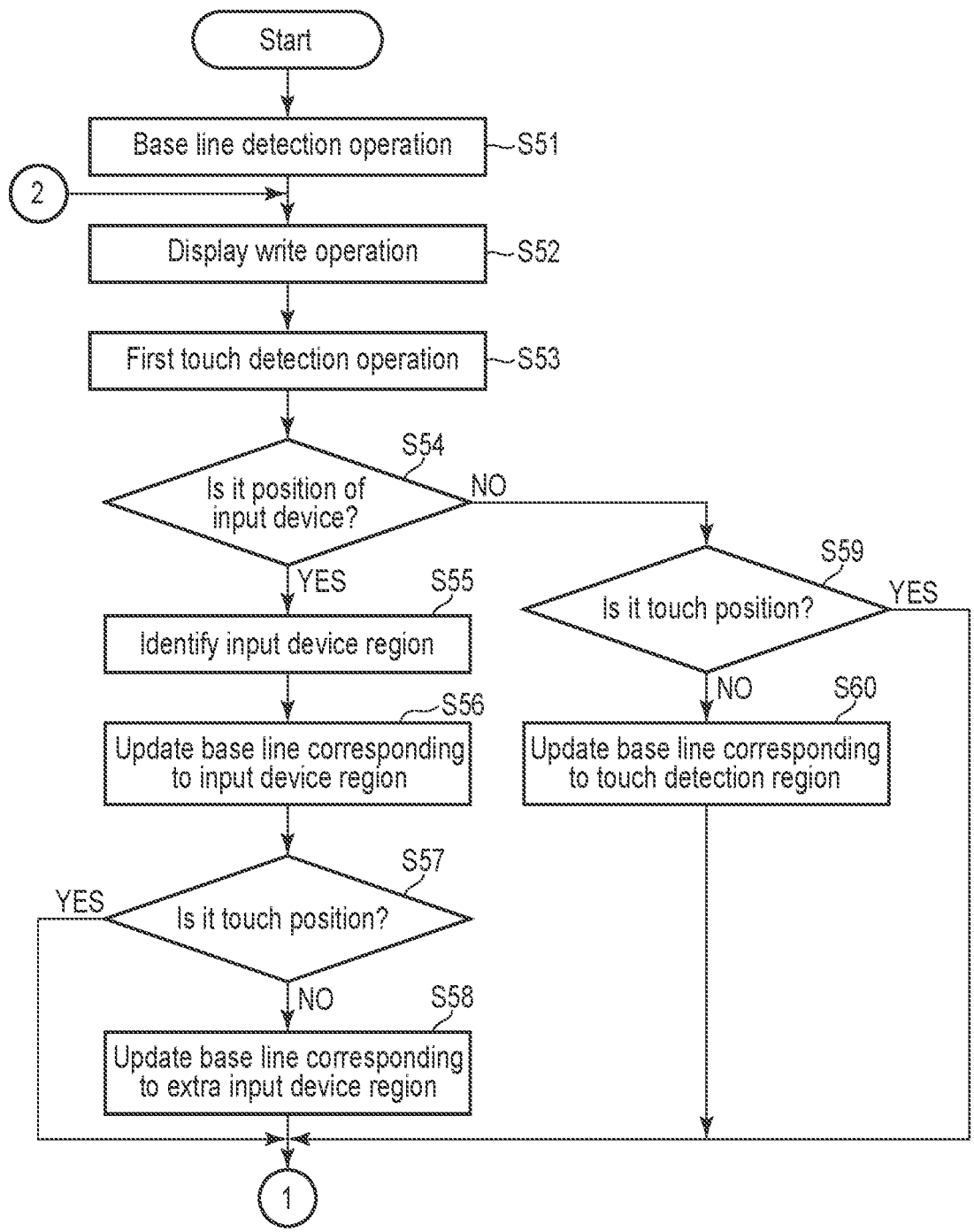
FIG. 19 is a flowchart illustrating an example of a fifth process of the sensor controller.
Figure 20:
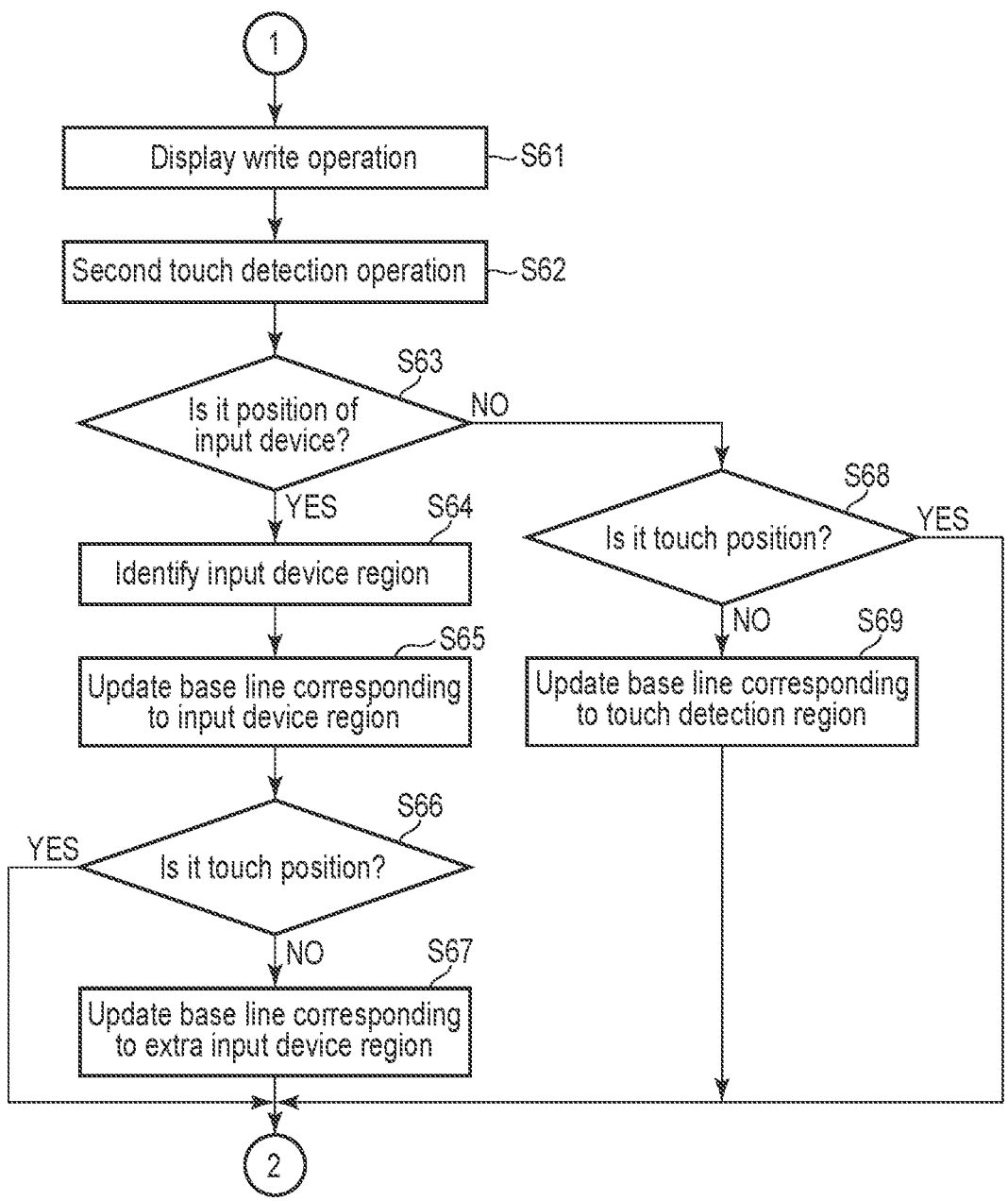
FIG. 20 is a flowchart illustrating an example of the fifth process of the sensor controller.

Further, referring to flowcharts in FIGS. 19 and 20, another example of the process procedure of the sensor controller 4 that updates the baseline corresponding to the input device region 2b will be described. Here, differences from the process illustrated in FIG. 17 will be mainly described. In the following description, processes illustrated in FIGS. 19 and 20 are referred to as a fifth process of the sensor controller 4 for convenience.

In the case in which the touch panel 2 is turned on, processes in Steps S51 to S55 corresponding to the processes in Steps S21 to S25 illustrated in FIG. 17 are executed. In the description of FIGS. 19 and 20, the touch detection operation performed in Step S53 is referred to as a first touch detection operation for convenience.

When the process in Step S55 is executed, the sensor controller 4 updates the baseline corresponding to the input device region 2b (Step S56). In this case, the sensor controller 4 sets, as a baseline corresponding to the input device region 2b, a detection value (i.e., the detection line corresponding to the input device region 2b) in the drive electrode 21 disposed at a position overlapping with the input device region 2b identified in Step S53 among the detection values acquired by executing the process in Step S55.

When the process in Step S56 is executed, the processes in Steps S57 and S58 corresponding to the processes in Steps S26 and S27 illustrated in FIG. 17 are executed. In the case in which it is determined in Step S57 that the touch position is detected (YES in Step S57) or in the case in which the process in Step S58 is executed, the process in Step S61 below is executed.

On the other hand, in the case in which it is determined in Step S54 that the position of the input device 3 is not detected (NO in Step S54), processes in Steps S59 and S60 corresponding to the processes in Steps S28 and S29 illustrated in FIG. 17 are executed. In the case in which it is determined in Step S59 that the touch position is detected (YES in Step S59) or in the case in which the process in Step S60 is executed, the process in Step S61 below is executed.

Subsequently, the sensor controller 4 performs a display write operation (Step S61). The process in Step S61 is similar to the process in Step S52.

When the process in Step S61 is executed, the sensor controller 4 performs a second touch detection operation (Step S62). The second touch detection operation in Step S62 is similar to the second touch detection operation described above with reference to FIG. 18. That is, in the second touch detection operation in Step S62, the plurality of drive electrodes 21 is driven at the non-resonance frequency, and the detection value in each drive electrode 21 is acquired as the detection line.

Here, for example, in the case in which it is determined in Step S54 described above that the position of the input device 3 is detected (i.e., the input device 3 is disposed on the touch panel 2), the baseline corresponding to the input device region 2b at the time when the process in Step S62 is executed is the detection value (i.e., the detection value based on the resonance frequency) acquired in the first touch detection operation in Step S53.

On the other hand, in the second touch detection operation in Step S62, a detection value based on the non-resonance frequency is acquired as a detection line.

In this case, for example, even in the case in which the positions of the conductors 31a and 31b included in the input device 3 are changed (i.e., the input device 3 is operated), or even in the case in which the positions of the conductors 31a and 31b are maintained (i.e., the input device 3 is not operated), the positions of the conductors 31a and 31b can be detected by calculating the difference between the detection line corresponding to the input device region 2b and the baseline.

Therefore, the sensor controller 4 can determine whether the position (i.e., positions of the conductors 31a and 31b) of the input device 3 is detected (Step S63).

In the case in which it is determined that the position of the input device 3 is detected (YES in Step S63), processes in Steps S64 to S67 corresponding to the processes in Steps S55 to S58 described above are executed. In the case in which it is determined in Step S66 that the touch position is detected (YES in Step S66) or in the case in which the process in Step S67 is executed, the process returns to Step S52 and the process is repeated.

On the other hand, in the case in which it is determined in Step S63 that the position of the input device 3 is not detected (NO in Step S63), processes in Steps S68 and S69 corresponding to the processes in Steps S59 and S60 described above are executed. In the case in which it is determined in Step S68 that the touch position is detected (YES in Step S68) or in the case in which the process in Step S69 is executed, the process returns to Step S52 and the process is repeated.

According to the fifth process of the sensor controller 4 illustrated in FIGS. 19 and 20, the first touch detection operation based on the resonance frequency and the second touch detection operation based on the non-resonance frequency are alternately performed, and the difference from the previous frame is detected, and thus both the update of the base line regarding the input device region 2b and the position detection of the input device 3 (conductors 31a and 31b) can be achieved.

Here, in FIGS. 19 and 20, the process in consideration of the case of detecting the touch position (i.e., the contact position of the user finger) on the touch panel 2 is described. However, in the case in which the detection of the touch position is not considered, a simpler process may be used.

Figure 21:
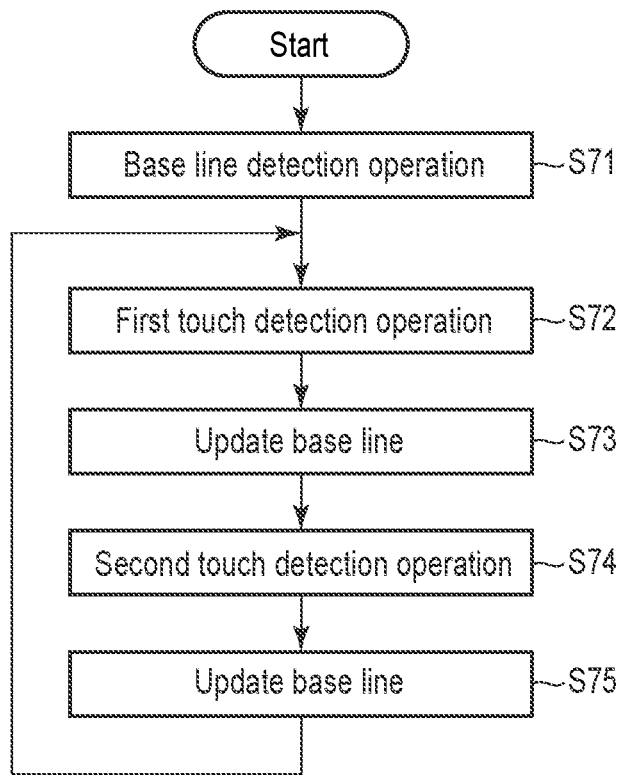
FIG. 21 is a flowchart illustrating an example of a sixth process of the sensor controller.

FIG. 21 illustrates an example of a process procedure of the sensor controller 4 in the case in which the detection of a touch position is not considered. In the following description, a process illustrated in FIG. 21 is referred to as a sixth process of the sensor controller 4 for convenience. The sixth process of the sensor controller 4 will be briefly described.

First, the sensor controller 4 performs a baseline detection operation (Step S71). According to this baseline detection operation, a detection value in each drive electrode 21 based on the non-resonance frequency is acquired as a baseline.

Subsequently, the sensor controller 4 performs a first touch detection operation (Step S72). According to the first touch detection operation, a detection value in each drive electrode 21 based on the resonance frequency is acquired as a detection line.

Here, since the baseline acquired by executing the process in Step S71 is based on the non-resonance frequency and the detection line acquired by executing the process in Step S72 is based on the resonance frequency, the position of the input device 3 (conductors 31a and 31b) can be detected by calculating the difference between the baseline and the detection line.

When the process in Step S72 is executed, the sensor controller 4 updates the baseline acquired by the execution of the process in Step S71 based on the detection line acquired by the execution of the process in Step S72 described above (Step S73).

Subsequently, the sensor controller 4 performs a second touch detection operation (Step S74). According to the second touch detection operation, a detection value in each drive electrode 21 based on the non-resonance frequency is acquired as a detection line.

Here, since the baseline updated in Step S73 is based on the resonance frequency and the detection line acquired by executing the process in Step S74 is based on the non-resonance frequency, the position of the input device 3 (conductors 31a and 31b) can be detected by calculating the difference between the baseline and the detection line.

When the process in Step S74 is executed, the sensor controller 4 further updates the baseline updated in Step S73 based on the detection line acquired by executing the process in Step S74 described above (Step S75). When the process in Step S75 is executed, the process returns to Step S72 and the process is repeated.

In the case in which the detection of the touch position by the user finger is not considered, as illustrated in FIG. 21, the first touch detection operation based on the resonance frequency and the second touch detection operation based on the non-resonance frequency are alternately performed, and the base line may be updated with the detection value (detection line) acquired in the touch detection operation.

Although the first to sixth processes are described as the processes of the sensor controller 4 in the present embodiment, the sensor controller 4 only has to execute at least one of the first to sixth processes. In addition, which of the first to sixth process is executed may be determined based on, for example, specifications, performance, or the like of the display device DSP (or the sensor device 1). The first to sixth processes of the sensor controller 4 may be executed in combination as appropriate.

As described above, in the present embodiment, the resonance circuit including the conductors 31a and 31b (first and second conductors) is provided in the inside of the input device 3, and the conductors 31a and 31b are capacitively coupled to at least one of the plurality of drive electrodes 21 included in the touch panel 2 in the case in which the input device 3 is disposed on the touch panel 2. In the present embodiment, the positions (coordinate positions) of the conductors 31a and 31b on the touch panel are detected by applying a voltage to the plurality of drive electrodes 21 included in the touch panel based on the resonance frequency of the resonance circuit.

In this case, for example, the position of the conductor 31a is detected by applying a voltage to the drive electrode 21 facing the conductor 31a, and the position of the conductor 31b is detected by applying a voltage to the drive electrode 21 facing the conductor 31b. The resonance circuit in the present embodiment is formed as a circuit in which the inductor L and the capacitor C are connected in parallel between the conductors 31a and 31b.

In the present embodiment, with such a configuration, it is possible to increase the detection value for detecting the physical state of the input device 3, and thus it is possible to suppress error detection on the input device 3 and to detect the user operation on the input device 3 disposed on the touch panel 2 with high accuracy.

In the case in which input device 3 in the present embodiment is formed as a knob (the input device 3a shown in FIG. 1), the positions of conductors 31a and 31b in the case in which the knob disposed on the touch panel 2 is rotated can be detected (i.e., the operation of the user rotating the knob is detected).

In the present embodiment, the input device 3 is mainly described as a knob. However, the input device 3 may be, for example, a knob (the input device 3b illustrated in FIG. 1), a button (the input device 3c illustrated in FIG. 1), a slider (the input device 3d illustrated in FIG. 1), or the like.

Figure 22:
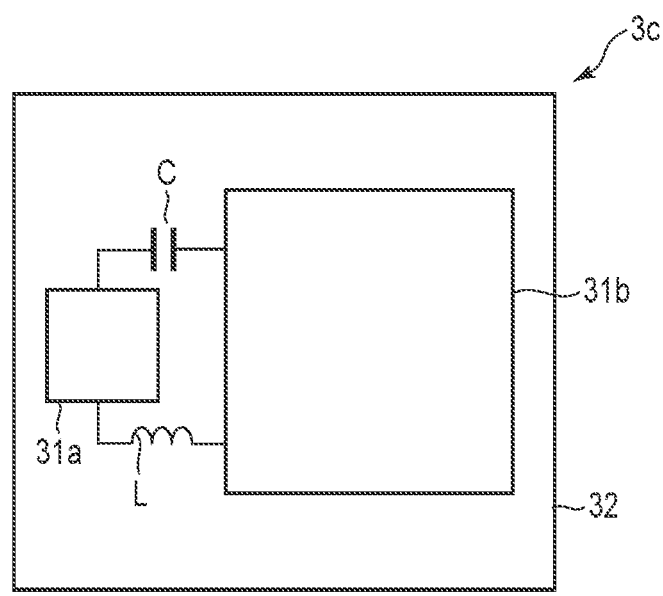
FIG. 22 is a diagram illustrating the planar structure of another example of the input device.

Here, FIG. 22 illustrates an example of the planar structure of the input device 3c (button). As illustrated in FIG. 22, a resonance circuit (LC circuit) including conductors 31a and 31b, an inductor L, and a capacitor C is provided in the inside of the input device 3c (non-conductor 32). The input device 3 is configured such that the conductors 31a and 31b are brought into contact or close to (i.e., at least one of the plurality of drive electrodes 21 is capacitively coupled) the touch panel 2 when the input device 3 is pressed. Accordingly, the positions of conductors 31a and 31b are detected when the input device 3c is pressed, it is possible to detect a user operation of the pressing input device 3c (button).

FIG. 23 illustrates an example of the planar structure of the input device 3d (slider). As illustrated in FIG. 23, a resonance circuit (LC circuit) including conductors 31a and 31b, an inductor L, and a capacitor C is provided in the inside of the input device 3c (non-conductor 32). The input device 3d is configured such that a second member is slidable along a first member formed to extend in one direction. In this case, the conductor 31a is disposed in the inside of the first member, and the conductor 31b is disposed in the inside of the second member. Further, the conductors 31a and 31b are in contact with or in proximity to the touch panel while the input device 3d is disposed on the touch panel 2. According to this, the positions of the conductors 31a and 31b are detected when the second member is slid along the first member, the user operation of sliding the second member can be detected.

Here, the input devices 3c (button) and 3d (slider) are described. However, the input device 3b (knobs) has an internal structure substantially similar to that of the input device 3a although the shape and size of the non-conductor 32 are different. Accordingly, it is possible to detect a user operation of rotating input device 3b (knob).

Figure 24:
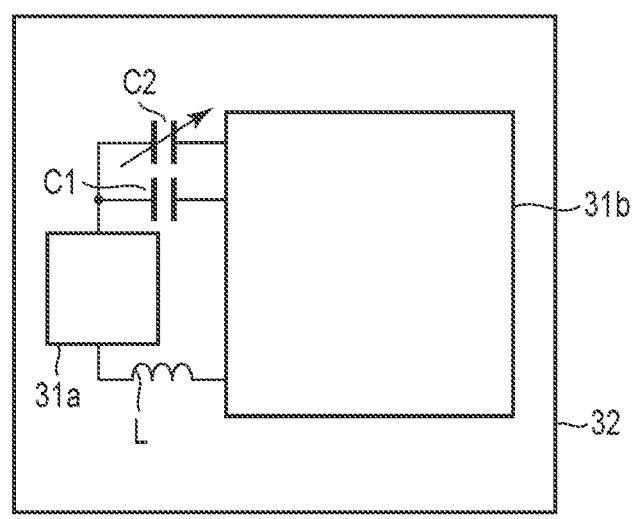
FIG. 24 is a diagram illustrating another example of the resonance circuit provided in the inside of the input device.

Note that a resonance circuit including, for example, capacitors C1 and C2 may be provided in the inside of the input device 3 as illustrated in FIG. 24. According to such an input device 3, for example, when an operation is performed on the input device 3, a change in resonance due to a change in a circuit in the inside of the input device 3 (e.g., two points in the circuit are short-circuited to cause the circuit not to be a resonance circuit, or the capacitance or the induction changes to cause the resonance frequency to change) can be detected as a user operation. Although FIG. 24 illustrates the case in which the input device 3 is a button, the configuration illustrated in FIG. 24 may be applied to an input device other than the button.

In the present embodiment, the input device 3 disposed on the touch panel 2 may be one other than the above-described input devices 3a to 3d as long as a resonance circuit including the conductors 31a and 31b is provided in the inside.

In the present embodiment, when the touch panel 2 is turned on, a voltage is applied to the plurality of drive electrodes 21 included in the touch panel 2 based on the non-resonance frequency of the resonance circuit, and thus a baseline (first detection value in the plurality of drive electrodes 21) is acquired. By applying a voltage to the plurality of drive electrodes 21 included in the touch panel based on the resonance frequency of the resonance circuit, a detection line (a second detection value in the plurality of electrodes 21) is acquired. In the present embodiment, the positions of the conductors 31a and 31b are detected by comparing the baseline with the detection line.

In the present embodiment, with such a configuration, it is possible to detect the initial state (initial positions of conductors 31a and 31b) of the input device 3 when the power of the touch panel 2 (display device DSP) is turned on (i.e., at the time of startup), and to detect a user operation based on a change in positions of conductors 31a and 31b from the initial state.

In the present embodiment, the plurality of drive electrodes 21 may be used also as electrodes for image display (common electrodes), and the display write operation (first operation) and the touch detection operation (second operation) may be performed by time division. According to such a configuration, a reduction in the profile of the display device DSP can be achieved.

In the present embodiment, in the case in which the position of the input device 3 (conductors 31a and 31b) is detected and the touch position (the position of another object such as a user finger) is not detected from the extra input device region 2c, the baseline corresponding to the extra input device region 2c is updated using the detection line corresponding to the extra input device region 2c.

In the present embodiment, in the case in which the position of the input device 3 is detected, the detection line (third detection value) corresponding to the input device region 2b may be acquired based on the non-resonance frequency, and the base line corresponding to the input device region 2b may be updated based on the detection line.

In the present embodiment, regardless of whether the position of the input device 3 is detected, a detection line (a third detection value in the plurality of drive electrodes 21 by applying a voltage to the plurality of electrodes included in the touch panel 2) corresponding to the touch detection region 2a may be further acquired based on the non-resonance frequency of the resonance circuit, and the base line may be updated based on the detection line.

In the present embodiment, with the configuration in which the above-described process is executed, for example, even in the case in which the detection value in each drive electrode 21 changes according to a change in environment or the like, the touch detection operation with high accuracy can be performed using an appropriate baseline.

Second Embodiment

Next, a second embodiment will be described. Although the sensor device including the self-capacitive touch panel is described in the first embodiment described above, the present embodiment is different from the first embodiment in that a sensor device includes a touch panel (in the following, referred to as a mutual-capacitive touch panel) that performs mutual capacitive touch detection.

The appearance of the sensor device according to the present embodiment is similar to that of the first embodiment described above, and thus a detailed description will be omitted here.

Figure 25:
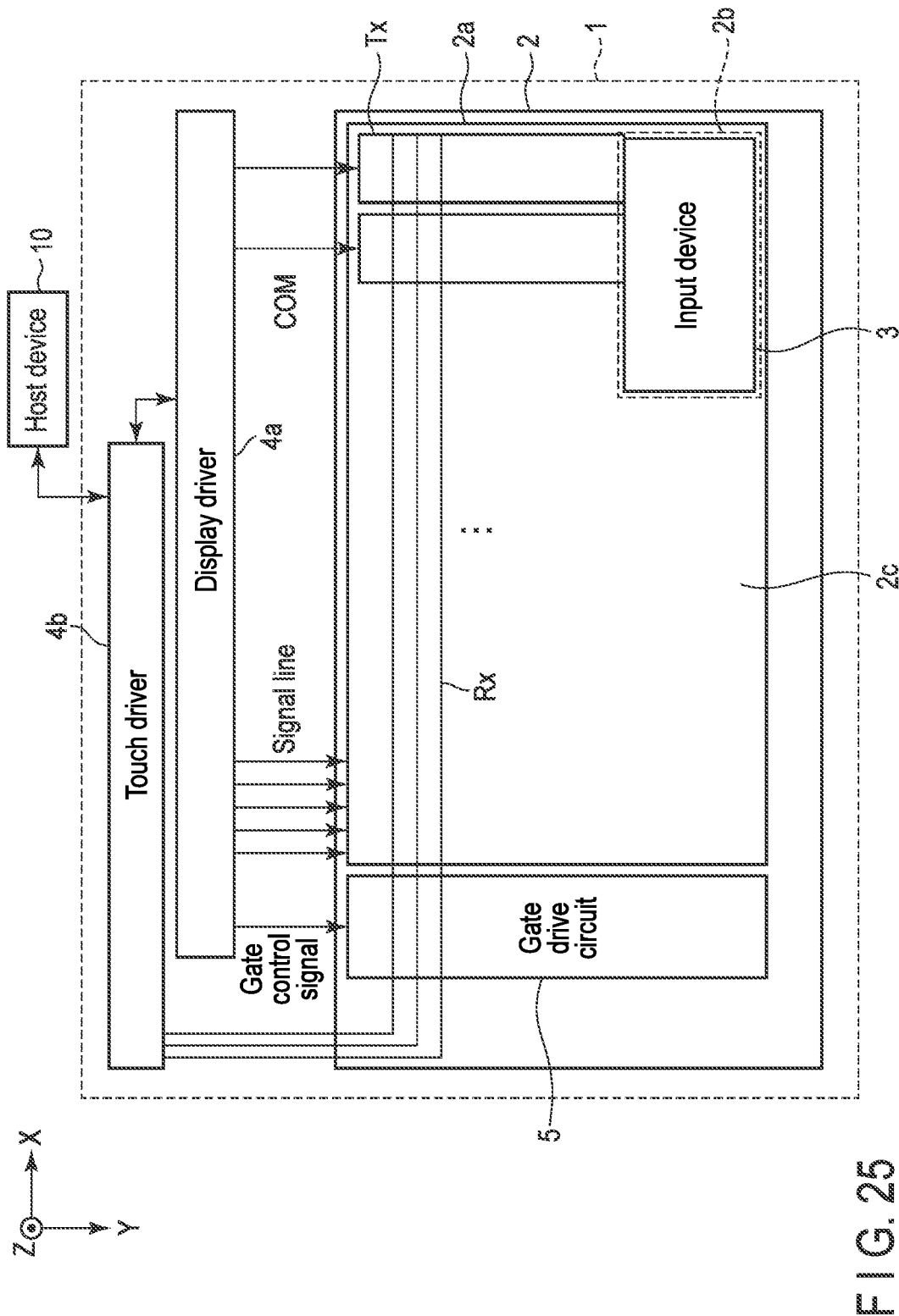
FIG. 25 is a diagram illustrating an example of the configuration of a sensor device according to a second embodiment.

FIG. 25 illustrates an example of the configuration of a sensor device 1 according to the present embodiment. In FIG. 25, the same portions as those in FIG. 2 described above are designated with the same reference numerals, and the detailed description will be omitted. Here, portions different from those in FIG. 2 will be mainly described.

As illustrated in FIG. 25, the sensor device 1 includes a touch panel 2, an input device 3, a display controller (display driver) 4a, and a touch controller (touch driver) 4b.

The touch panel 2 is a mutual-capacitive touch panel, and includes a plurality of drive electrodes Tx and a plurality of detection electrodes Rx. The plurality of drive electrodes Tx is arranged at intervals in one direction. On the other hand, the plurality of detection electrodes Rx is arranged at intervals so as to intersect with the drive electrode Tx. In the example illustrated in FIG. 25, the plurality of drive electrodes Tx extends in the second direction Y, for example, and is disposed side by side in the first direction X. On the other hand, the plurality of detection electrodes Rx extends in, for example, the first direction X and is disposed side by side in the second direction Y. In such a touch panel 2, a region in which the plurality of drive electrodes Tx and the plurality of detection electrodes Rx intersect with each other corresponds to the touch detection region 2a.

The plurality of drive electrodes Tx is also used as, for example, an electrode (common electrode) for image display, and is connected to the display controller 4a through wires. The plurality of detection electrodes Rx is connected to the touch controller 4b through wires.

The input device 3 is disposed on the touch panel 2. The input device 3 may be at least one of the input devices 3a to 3d illustrated in FIG. 1 described above. In the following description, the case in which the input device 3 is the input device 3a will be mainly described.

The display controller 4a and the touch controller 4b correspond to a sensor controller that controls the touch panel 2. The display controller 4a applies a predetermined voltage (drive signal COM) to the plurality of drive electrodes Tx. As a result, the plurality of drive electrodes Tx generates capacitance (mutual capacitance) with the detection electrode Rx disposed at a position intersecting with the drive electrode Tx. The touch controller 4b acquires detection values of the detection electrodes Rx, and detects a user operation on the input device 3. The touch controller 4b can also detect, for example, contact or proximity (i.e., the operation of the user with the finger) of a user finger to an extra input device region 2c. The detection result by the touch controller 4b is output to, for example, an external host device 10 or the like. In the host device 10, processes according to the detection result (user operation) are executed.

The display controller 4a is connected to a plurality of pixels disposed in the display region of the display device on which the touch panel 2 is mounted, the gate drive circuit 5, and the like, and displays an image in the display region.

Figure 26:
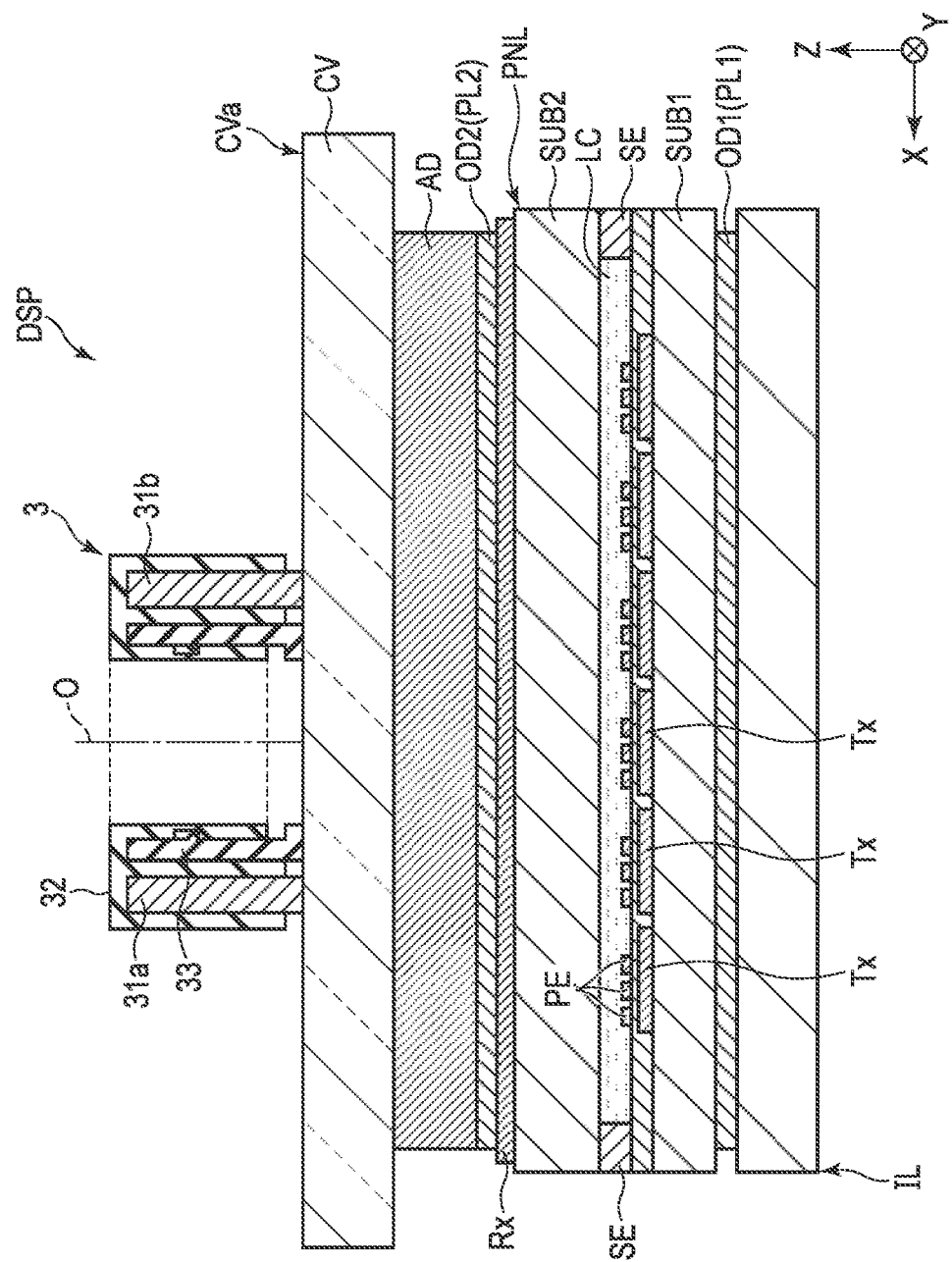
FIG. 26 is a view illustrating an example of the cross-sectional structure of a display device on which the sensor device is mounted.

FIG. 26 illustrates an example of the cross-sectional structure of a display device DSP on which the sensor device 1 is mounted. In FIG. 26, the same portions as those in FIG. 3 described above are designated with the same reference numerals, and the detailed description will be omitted. Here, portions different from those in FIG. 3 will be mainly described.

Although the first substrate SUB1 includes the plurality of drive electrodes 21 in the first embodiment described above, in the present embodiment, a first substrate SUB1 includes the plurality of drive electrodes (common electrodes) Tx, and a second substrate SUB2 includes the detection electrodes Rx.

Although not illustrated in FIG. 26, the display controller 4a is disposed on, for example, the first substrate SUB1, and the touch controller 4b is disposed on, for example, a flexible circuit board connected to the second substrate SUB2.

Although FIG. 26 illustrates an in-cell display device DSP in which the touch panel 2 is built in a display panel PNL, the display device DSP may be an out-cell type or an on-cell type in which the touch panel 2 is provided so as to overlap with the display panel PNL.

Here, the configuration of the input device 3 disposed on the touch panel 2 in the present embodiment is as described in the first embodiment described above. That is, a resonance circuit (LC circuit) including conductors 31a and 31b, an inductor L, and a capacitor C is provided in the inside of the input device 3. Note that the description of the circuit configuration of the resonance circuit is omitted here.

In the following, referring to FIG. 27, the basic principle of the touch detection operation using the resonance circuit provided in the input device 3 will be described. In the resonance circuit illustrated in FIG. 27, a resistor R is omitted.

In the present embodiment, the mutual capacitive touch detection (operation) is performed, and thus the drive electrode Tx is connected to a predetermined voltage Vdd through a switch 24 as illustrated in FIG. 27. The detection electrode Rx is connected to a detector 25 through a switch 26. The detection electrode Rx is connected to the detector 25 in the case in which the switch 26 is in the on state, and is connected to a GND in the case in which the switch 26 is in the off state.

In FIG. 27, the operation of the resonance circuit will be described in the case in which a voltage is applied to the drive electrode Tx disposed at a position facing the conductor 31b. In this case, the voltage of the conductor 31a (capacitive coupling part) is V1, the voltage of the conductor 31b (capacitive coupling part) is V2, and the voltage of the drive electrode Tx is V3. In the present embodiment, since the plurality of drive electrodes Tx is sequentially driven, in the case in which a voltage is applied to the drive electrode Tx disposed at a position facing the conductor 31a, the conductor 31a is in a state of being connected to the GND.

In such a resonance circuit, resonance occurs, for example, in the case in which one of the drive electrodes 21 disposed at positions facing the capacitive coupling parts (conductors 31a and 31b) is taken as a reference and the other swings at a resonance frequency. In the case in which resonance occurs in the resonance circuit, the conductors 31a and 31b resonate in opposite phases.

In FIG. 27, the capacitance (electrostatic capacitance) between the conductor 31a and the electrode on the touch panel 2 side is denoted as C1, the capacitance of the capacitor C included in the resonance circuit is denoted as C2, the capacitance between the conductor 31b and the drive electrode Tx disposed at the position facing the conductor 31b is denoted as CTx, the capacitance between the conductor 31b and the detection electrode Rx disposed at the position facing the conductor 31b is denoted as CRx, and the capacitance between the drive electrode Tx disposed at the position facing the conductor 31a and the detection electrode Rx is denoted as CTxRx.

Figure 28:
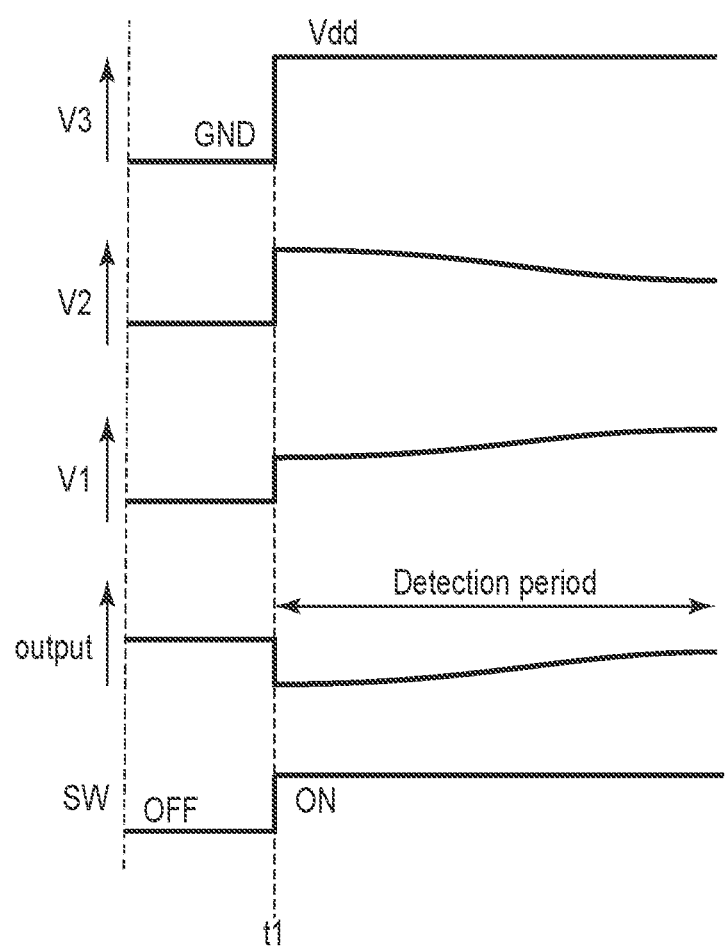
FIG. 28 is a diagram illustrating an example of a relationship between voltages at the time of the touch detection operation, detection values output from a detector, and the state of a switch.

Here, FIG. 28 illustrates an example of a relationship among the voltages V1 to V3, the detection value (output) output from the detector 25, and the state of the switch 26 (SW) in the above-described touch detection operation.

At the moment when the switch 24 is switched to Vdd at time t1 in the touch detection operation, no current flows through the inductor L of the resonance circuit, and a potential difference is generated between V1 and V2 due to capacitance distribution.

In this case, since the voltages V2 and V3 increase, the current flows from the detector 25 side to Rx, and the potential on the output side of the detector 25 decreases.

Subsequently, since a potential difference is generated between V1 and V2 after time t1, a current starts to flow through the inductor L (i.e., resonance starts at a resonance frequency determined by the inductor L and the capacitor C).

Since the potential of V2 decreases as a result of the current flowing through the inductor L in this manner, the current flows into the conductor 31b from the detector 25 side, and the potential on the output side of the detector 25 increases.

Figure 29:
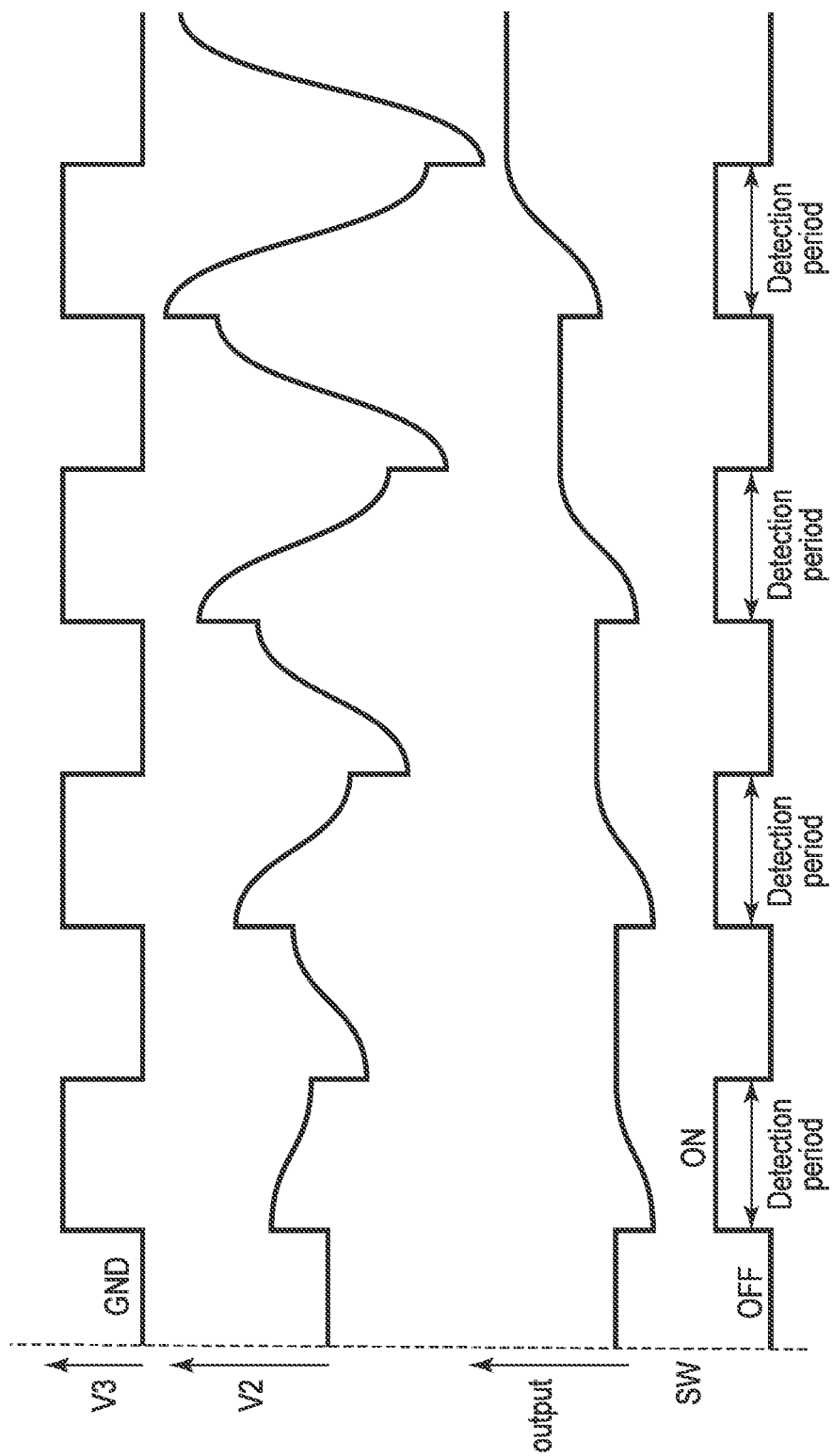
FIG. 29 is a diagram illustrating an example of detection values in the touch detection operation.

As illustrated in FIG. 29, the above-described operation is repeated to increase the amplitude of resonance in the resonance circuit, and the electric charges charged in the detector 25 per detection period increase.

Here, the case is described in which a voltage is applied (i.e., the drive electrode Tx is driven at the resonance frequency) to the drive electrode Tx facing the conductor 31b based on the resonance frequency. However, a similar operation is performed also in the case in which a voltage is applied to the drive electrode Tx facing the conductor 31a.

The operation of the sensor device 1 (touch panel 2) when the operation of the user is detected in the present embodiment is as described in the first embodiment described above, and thus the detailed description will be omitted here. The process executed by the sensor controller 4 in the first embodiment described above is executed by the display controller 4a and the touch controller 4b in the present embodiment. Specifically, the process of driving the plurality of drive electrodes Tx at the non-resonance frequency and the resonance frequency and the display write operation are executed by the display controller 4a, and the other processes are executed by the touch controller 4b.

As described above, in the present embodiment, even in the case in which the sensor device 1 includes a mutual-capacitive touch panel 2, with the provision of the resonance circuit including the conductors 31a and 31b in the inside of the input device 3, it is possible to detect the user operation on the input device 3 disposed on the touch panel 2 with high accuracy, similarly to the first embodiment described above.

Figure 30:
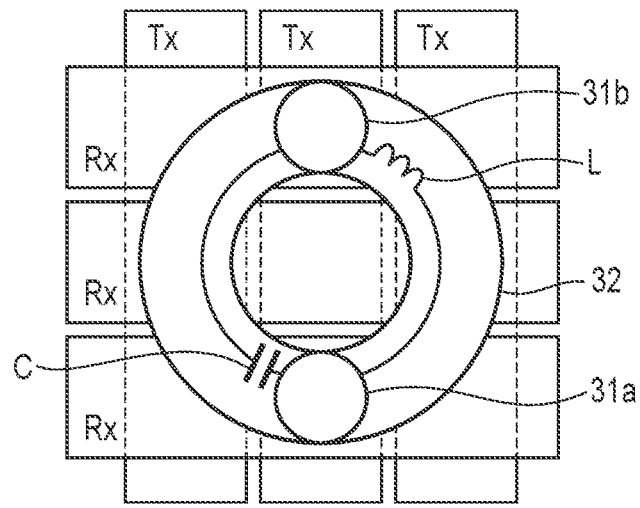
FIG. 30 is a diagram describing the case in which the position of the input device fails to be detected.

Here, the sensor device 1 according to the present embodiment includes the mutual-capacitive touch panel 2. However, depending on the user operation on the input device 3, the conductors 31a and 31b included in the input device 3 may be disposed to face (overlap with) the same drive electrode Tx as illustrated in FIG. 30.

In this case, even in the case in which a voltage is applied to the drive electrode Tx opposed to the conductors 31a and 31b, no potential difference is generated between the conductors 31a and 31b, and thus the position of the input device 3 (conductors 31a and 31b) fails to be detected.

Figure 31:
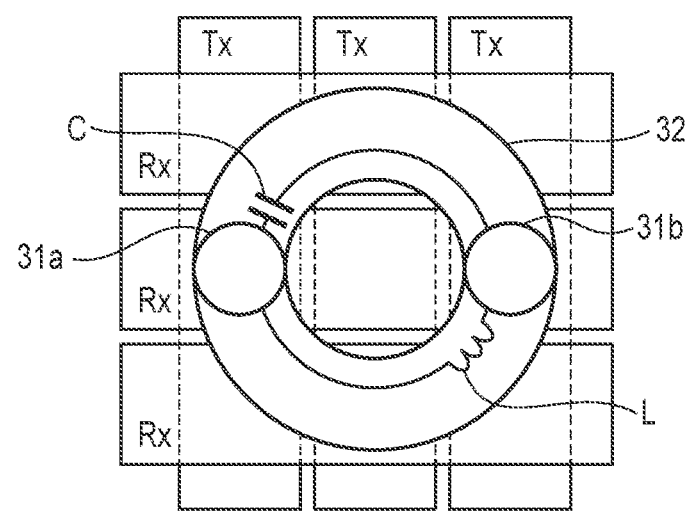
FIG. 31 is a diagram describing the case in which the position of the input device fails to be detected.

In addition, depending on the user operation on the input device 3, as illustrated in FIG. 31, two conductors 31a and 31b included in the input device 3 may be disposed to face (overlap with) the same detection electrode Rx.

In this case, since the two conductors 31a and 31b resonate in opposite phases to cancel each other and no potential is generated in the detection electrode Rx, a potential change due to resonance fails to be acquired as a detection value. Therefore, the position of the input device 3 (conductors 31a and 31b) fails to be detected.

That is, in the present embodiment, as described above, in the case in which the conductors 31a and 31b face the same drive electrode Tx and face the same detection electrode Rx, there is a possibility that the position of the input device 3 fails to be detected.

Therefore, in the present embodiment, in the case in which the input device 3 is disposed on the touch panel 2, the input device 3 is configured such that the drive electrode Tx (first electrode) facing the conductor 31a (first conductor) and the drive electrode Tx facing the conductor 31b (second conductor) are different, and the detection electrode Rx (second electrode) facing the conductor 31a and the detection electrode Rx facing the conductor 31b are different.

Figure 32:
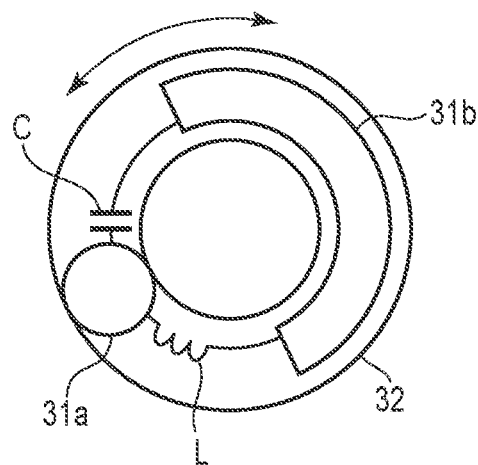
FIG. 32 is a diagram illustrating an example of the planar structure of the input device.

Here, FIG. 32 illustrates an example of the planar structure of the input device 3 (input device 3a) in which a non-conductor 32 is formed in a knob shape. FIG. 32 illustrates an example in which the conductor 31b is formed in a C shape in the inside of the non-conductor 32, for example.

Figure 33:
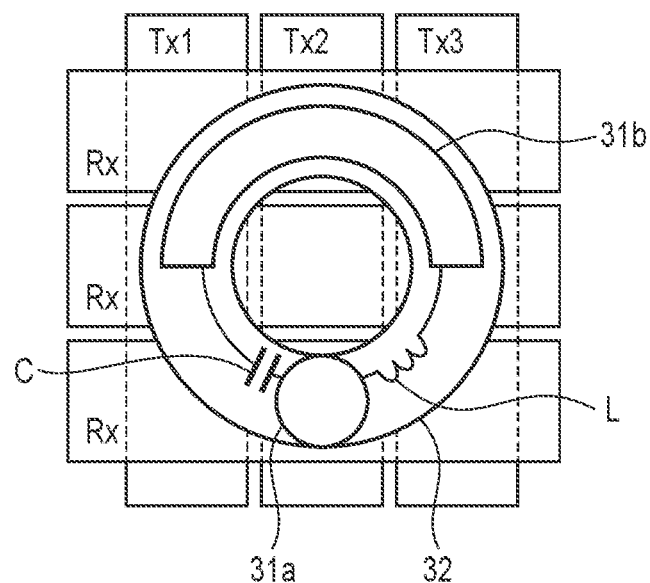
FIG. 33 is a diagram describing a positional relationship between a conductor, a drive electrode, and a detection electrode provided in the input device.
Figure 34:
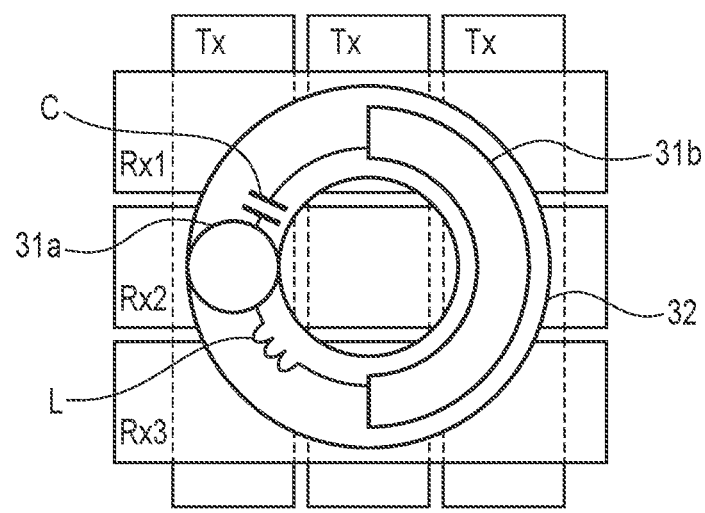
FIG. 34 is a diagram describing a positional relationship between a conductor, a drive electrode, and a detection electrode provided in the input device.

According to such an input device 3, as illustrated in FIG. 33, the drive electrode Tx facing the conductor 31a and the drive electrode Tx facing the conductor 31b can be made different from each other. Further, according to the input device 3, as illustrated in FIG. 34, the detection electrode Rx facing the conductor 31a and the detection electrode Rx facing the conductor 31b can be made different from each other. In this case, a situation in which the position of the input device 3 (conductors 31a and 31b) fails to be detected as described above with reference to FIGS. 30 and 31 can be avoided.

The input device 3 (conductors 31a and 31b) illustrated in FIG. 32 is an example, and the shapes and sizes of the conductors 31a and 31b may be different from those illustrated in FIG. 32 as long as the conductors 31a and 31b are formed such that a state in which the drive electrodes Tx facing the conductors 31a and 31b match each other and a state in which the detection electrodes Rx facing the conductors 31a and 31b match each other fails to occur.

In the case in which the input device 3 is a button (input device 3c), for example, when the conductors 31a and 31b are formed as illustrated in FIG. 22 described above, the situation that the positions of the conductors 31a and 31b fail to be detected can be avoided.

Similarly, in the case in which the input device 3 is a slider (input device 3d), for example, when the conductors 31a and 31b are formed as illustrated in FIG. 23 described above, the situation that the positions of the conductors 31a and 31b fail to be detected can be avoided.

As described above, according to the embodiments, it is possible to provide a sensor device capable of detecting a user operation with high accuracy.

The following are additional items to the present embodiments.

[C1] A sensor device including:
a capacitive touch panel including a plurality of electrodes;
an input device configured such that a resonance circuit including a first conductor and a second conductor is covered with a non-conductor; and
a sensor controller configured to control the touch panel, wherein
the first conductor and the second conductor are capacitively coupled to at least one of a plurality of electrodes in the touch panel when the input device is disposed on the touch panel or when the input device disposed on the touch panel is operated, and
the sensor controller is configured to detect positions of the first conductor and the second conductor on the touch panel by applying a voltage to the plurality of electrodes in the touch panel based on a resonance frequency of the resonance circuit.

[C2] The sensor device according to item [C1], wherein
the plurality of electrodes include a first electrode facing the first conductor and a second electrode facing the second conductor when the input device is disposed on the touch panel, and
the sensor controller is configured to detect a position of the first conductor by applying a voltage to the first electrode, and detects a position of the second conductor by applying a voltage to the second electrode.

[C3] The sensor device according to item [C1], wherein the resonance circuit is a circuit in which an inductor and a capacitor are connected in parallel between the first conductor and the second conductor.

[C4] The sensor device according to item [C1], wherein
the input device is formed as a knob that is rotatable about a rotation axis,
the first conductor and the second conductor are held by the knob and disposed on a part of a circumference around the rotation axis, and
the sensor controller is configured to detect positions of the first conductor and the second conductor when the knob disposed on the touch panel is rotated.

[C5] The sensor device according to item [C1], wherein
the input device is formed as a button capable of switching between a first state in which the button is pressed and a second state in which the button is not pressed,
the first conductor and the second conductor are disposed in the input device so as to be capacitively coupled to at least one of the plurality of electrodes in the touch panel in the first state and so as not to be capacitively coupled to a plurality of electrodes in the touch panel in the second state, and
the sensor controller is configured to detect positions of the first conductor and the second conductor when the input device is in the first state.

[C6] The sensor device according to item [C1], wherein
the input device is formed as a slider including a first member formed to extend in at least one direction and a second member formed to be slidable along the first member,
the first conductor is disposed in an inside of the first member,
the second conductor is disposed in an inside of the second member, and
the sensor controller is configured to detect positions of the first conductor and the second conductor when the second member is slid to the first member.

[C7] The sensor device according to item [C1], wherein the sensor controller is configured to detect positions of the first conductor and the second conductor based on a self-capacitance of the plurality of electrodes in the touch panel.

[C8] The sensor device according to item [C1], wherein
the plurality of electrodes in the touch panel includes a plurality of first electrodes disposed side by side in a second direction intersecting with a first direction so as to extend in the first direction, and a plurality of second electrodes disposed side by side in the first direction so as to extend in the second direction, and
the sensor controller is configured to detect positions of the first conductor and the second conductor based on mutual capacitance between the plurality of first electrodes and the plurality of second electrodes.

[C9] The sensor device according to item [C8], wherein
the first conductor and the second conductor face at least one of the plurality of first electrodes when the input device is disposed on the touch panel,
the first conductor and the second conductor face at least one of the plurality of second electrodes when the input device is disposed on the touch panel, and
a first electrode facing the first conductor and a first electrode facing the second conductor are different, and a second electrode facing the first conductor and a second electrode facing the second conductor are different.

[C10] The sensor device according to item [C1], wherein
the sensor controller is configured to
acquire a first detection value in the plurality of electrodes by applying a voltage to the plurality of electrodes in the touch panel based on a non-resonance frequency of the resonance circuit when power of the touch panel is turned on,
acquire a second detection value in the plurality of electrodes by applying a voltage to the plurality of electrodes in the touch panel based on a resonance frequency of the resonance circuit, and
detect positions of the first conductor and the second conductor by comparing the first detection value with the second detection value.

[C11] The sensor device according to item [C10], wherein
the touch panel is mounted on a display device, and
the sensor controller is configured to perform a first operation of displaying an image on the display device and a second operation of detecting positions of the first conductor, the second conductor, and another object on the touch panel by time division.

[C12] The sensor device according to item [C11], wherein
the sensor controller is configured to,
when positions of the first conductor and the second conductor are detected and a position of the other object is not detected from a second region other than a first region in which the input device is disposed, update a first detection value acquired by applying a voltage to an electrode corresponding to the second region based on a second detection value acquired by applying a voltage to an electrode corresponding to the second region, and
further detect positions of the first conductor and the second conductor using the updated first detection value.

[C13] The sensor device according to item [C12], wherein
the sensor controller is configured to,
when positions of the first conductor and the second conductor are detected, further acquire a third detection value in the plurality of electrodes by applying a voltage to an electrode corresponding to the first region based on a non-resonance frequency of the resonance circuit,
update a first detection value acquired by applying a voltage to an electrode corresponding to the first region based on the third detection value, and
further detect positions of the first conductor and the second conductor using the updated first detection value.

[C14] The sensor device according to item [C10], wherein
the sensor controller is configured to
further acquire a third detection value in the plurality of electrodes by applying a voltage to the plurality of electrodes in the touch panel based on a non-resonance frequency of the resonance circuit,
update the first detection value based on the third detection value, and
further detect positions of the first conductor and the second conductor using the updated first detection value.

[C15] An input device disposed on a capacitive touch panel including a plurality of electrodes for use, the input device including:
a first conductor;
a second conductor;
a resonance circuit including the first conductor and the second conductor; and
a non-conductor formed so as to cover the resonance circuit, wherein
the first conductor and the second conductor are capacitively coupled to at least one of a plurality of electrodes in the touch panel when the input device is disposed on the touch panel or when the input device disposed on the touch panel is operated, and positions of the first conductor and the second conductor on the touch panel are detected by applying a voltage to the plurality of electrodes in the touch panel based on a resonance frequency of the resonance circuit.

[C16] A method executed by a sensor device including a capacitive touch panel including a plurality of electrodes, an input device configured such that a resonance circuit including a first conductor and a second conductor is covered with a non-conductor, and a sensor controller configured to control the touch panel, the method including:

capacitively coupling the first conductor and the second conductor with at least one of a plurality of electrodes in the touch panel when the input device is disposed on the touch panel or when the input device disposed on the touch panel is operated;

applying a voltage to the plurality of electrodes in the touch panel based on a resonance frequency of the resonance circuit; and detecting positions of the first conductor and the second conductor on the touch panel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device comprising:
    a capacitive touch panel comprising a plurality of electrodes;
    an input device configured such that a resonance circuit comprising a first conductor and a second conductor is covered with a non-conductor; and
    a sensor controller configured to control the touch panel, wherein
    the first conductor and the second conductor are capacitively coupled to at least one of a plurality of electrodes in the touch panel when the input device is disposed on the touch panel or when the input device disposed on the touch panel is operated,
    the sensor controller is configured to:
        acquire a first detection value in the plurality of electrodes by applying a voltage to the plurality of electrodes in the touch panel based on a non-resonance frequency of the resonance circuit when power of the touch panel is turned on;
        acquire a second detection value in the plurality of electrodes by applying a voltage to the plurality of electrodes in the touch panel based on a resonance frequency of the resonance circuit; and
        detect positions of the first conductor and the second conductor by comparing the first detection value with the second detection value,
    the touch panel is mounted on a display device, and
    the sensor controller is configured to:
        perform a first operation of displaying an image on the display device and a second operation of detecting positions of the first conductor, the second conductor and another object on the touch panel by time division;
        when positions of the first conductor and the second conductor are detected and a position of the other object is not detected from a second region other than a first region in which the input device is disposed, update a first detection value acquired by applying a voltage to an electrode corresponding to the second region based on a second detection value acquired by applying a voltage to an electrode corresponding to the second region; and
        further detect positions of the first conductor and the second conductor using the updated first detection value.

2. The sensor device according to claim 1, wherein the sensor controller is configured to:
    when positions of the first conductor and the second conductor are detected, further acquire a third detection value in the plurality of electrodes by applying a voltage to an electrode corresponding to the first region based on a non-resonance frequency of the resonance circuit;
    update a first detection value acquired by applying a voltage to an electrode corresponding to the first region based on the third detection value; and
    further detect positions of the first conductor and the second conductor using the updated first detection value.

3. The sensor device according to claim 1, wherein the sensor controller is configured to:
    further acquire a third detection value in the plurality of electrodes by applying a voltage to the plurality of electrodes in the touch panel based on a non-resonance frequency of the resonance circuit;
    update the first detection value based on the third detection value; and
    further detect positions of the first conductor and the second conductor using the updated first detection value.

4. The sensor device according to claim 1, wherein the plurality of electrodes comprise a first electrode facing the first conductor and a second electrode facing the second conductor when the input device is disposed on the touch panel, and
    the sensor controller is configured to detect a position of the first conductor by applying a voltage to the first electrode, and detect a position of the second conductor by applying a voltage to the second electrode.

5. The sensor device according to claim 1, wherein the resonance circuit is a circuit in which an inductor and a capacitor are connected in parallel between the first conductor and the second conductor.

6. The sensor device according to claim 1, wherein the input device is formed as a knob that is rotatable about a rotation axis,
    the first conductor and the second conductor are held by the knob and disposed on a part of a circumference around the rotation axis, and
    the sensor controller is configured to detect positions of the first conductor and the second conductor when the knob disposed on the touch panel is rotated.

7. The sensor device according to claim 1, wherein the input device is formed as a button capable of switching between a first state in which the button is pressed and a second state in which the button is not pressed, the first conductor and the second conductor are disposed in the input device so as to be capacitively coupled to at least one of the plurality of electrodes in the touch panel in the first state and so as not to be capacitively coupled to a plurality of electrodes in the touch panel in the second state, and the sensor controller is configured to detect positions of the first conductor and the second conductor when the input device is in the first state.

8. The sensor device according to claim 1, wherein the input device is formed as a slider comprising a first member formed to extend in at least one direction and a second member formed to be slidable along the first member, the first conductor is disposed in an inside of the first member, the second conductor is disposed in an inside of the second member, and the sensor controller is configured to detect positions of the first conductor and the second conductor when the second member is slid to the first member.

9. The sensor device according to claim 1, wherein the sensor controller is configured to detect positions of the first conductor and the second conductor based on a self-capacitance of the plurality of electrodes in the touch panel.

10. The sensor device according to claim 1, wherein the plurality of electrodes in the touch panel comprises a plurality of first electrodes disposed side by side in a second direction intersecting with a first direction so as to extend in the first direction, and a plurality of second electrodes disposed side by side in the first direction so as to extend in the second direction, and the sensor controller is configured to detect positions of the first conductor and the second conductor based on mutual capacitance between the plurality of first electrodes and the plurality of second electrodes.

11. The sensor device according to claim 10, wherein the first conductor and the second conductor face at least one of the plurality of first electrodes when the input device is disposed on the touch panel, the first conductor and the second conductor face at least one of the plurality of second electrodes when the input device is disposed on the touch panel, and a first electrode facing the first conductor and a first electrode facing the second conductor are different, and a second electrode facing the first conductor and a second electrode facing the second conductor are different.

* * * * *